US012671658B2

(12) United States Patent
Zhang et al.

(10) Patent No.: US 12,671,658 B2
(45) Date of Patent: Jun. 30, 2026

(54) LOAD SHARING PACKET SENDING METHOD, DEVICE, AND SYSTEM

(71) Applicant: Huawei Technologies Co., Ltd., Shenzhen (CN)

(72) Inventors: Yaokun Zhang, Beijing (CN); Chunxia Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 448 days.

(21) Appl. No.: 18/308,927

(22) Filed: Apr. 28, 2023

(65) Prior Publication Data

US 2023/0269186 A1 Aug. 24, 2023

Related U.S. Application Data

(63) Continuation of application No. PCT/CN2021/123643, filed on Oct. 13, 2021.

(30) Foreign Application Priority Data

Oct. 31, 2020 (CN) .......................... 202011195793.9

(51) Int. Cl.
H04L 47/125 (2022.01)
H04L 45/745 (2022.01)

(52) U.S. Cl.
CPC .......... H04L 47/125 (2013.01); H04L 45/745 (2013.01)

(58) Field of Classification Search
CPC ............................ H04L 47/125; H04L 45/745
See application file for complete search history.

(56) References Cited

U.S. PATENT DOCUMENTS

| 10,419,341 B2 * | 9/2019 | Jiang et al. ............. H04L 45/74 |
| 10,523,466 B1 * | 12/2019 | Sivaraj ................. H04L 12/4679 |
| 2006/0171404 A1 * | 8/2006 | Nalawade et al. ...... H04L 12/56 |
| | | 370/401 |
| 2014/0351371 A1 | 11/2014 | Smith et al. |
| 2015/0127701 A1 * | 5/2015 | Chu et al. ............... H04L 67/10 |
| 2018/0131619 A1 * | 5/2018 | Hao ......................... H04L 45/66 |
| 2020/0059459 A1 * | 2/2020 | Abraham et al. ... H04L 64/0485 |
| 2021/0409323 A1 * | 12/2021 | Menon et al. .......... H04L 45/66 |

(Continued)

FOREIGN PATENT DOCUMENTS

| CN | 104243334 A | 12/2014 |
| CN | 104735101 A | 6/2015 |
| CN | 106656843 A | 5/2017 |

(Continued)

OTHER PUBLICATIONS

Rabadan, J. et al., "Framework for Ethernet VPN Designated Forwarder Election Extensibility", Request for Comments: 8584, Apr. 2019, 32 pages.

(Continued)

*Primary Examiner* — William C Vaughn, Jr.
(74) *Attorney, Agent, or Firm* — Slater Matsil, LLP

(57) ABSTRACT

This application provides a packet sending method, device, and system, and belongs to the field of network technologies. In a scenario in which a third network device is multi-homed to a first network device and a second network device, the first network device may forward a packet to the third network device in a manner of performing load sharing with the second network device.

20 Claims, 8 Drawing Sheets

(56)             References Cited

U.S. PATENT DOCUMENTS

2024/0223499 A1 *   7/2024   Kreger-Stickles et al. ..................
                                         H04L 45/586

FOREIGN PATENT DOCUMENTS

CN           108574639 A     9/2018
EP             3396897 A1 * 10/2018   .............   G06F 9/542

OTHER PUBLICATIONS

Sajassi, A. et al., "BGP MPLS-Based Ethernet VPN", Request for Comments: 7432, Feb. 2015, 56 pages.
Rabadan, J. et al., "Preference-based EVPN DF Election draft-ietf-bess-evpn-pref-df-06", Jun. 19, 2020, 30 pages.

* cited by examiner

Controller

Sending module                    1001

Network device 1100

Main control board 1110

Central processing unit
1112

Interface board 1130

Processor
1131

Memory
1132

Network
interface
1133

...

Network
interface
1133

...

Interface board 1140

Processor
1141

Memory
1142

Network
interface
1143

...

Network
interface
1143

LOAD SHARING PACKET SENDING METHOD, DEVICE, AND SYSTEM

CROSS-REFERENCE TO RELATED APPLICATIONS

This application is a continuation of International Application No. PCT/CN2021/123643, filed on Oct. 13, 2021, which claims priority to Chinese Patent Application No. 202011195793.9, filed on Oct. 31, 2020. The disclosures of the aforementioned applications are hereby incorporated by reference in their entireties.

TECHNICAL FIELD

This application relates to the field of network technologies, and in particular, to a packet sending method, device, and system.

BACKGROUND

In an Ethernet virtual private network (EVPN) multi-homing networking mode, one customer edge (CE) device may be connected to a plurality of provider edge (PE) devices in an EVPN through a plurality of links, that is, one CE device may be homed to a plurality of PE devices.

In a related technology, for the EVPN multi-homing networking mode, one PE device needs to be selected from a plurality of PE devices connected to a same CE as a designated forwarder (DF) device. In an EVPN multi-homing networking single-active mode, only the DF can forward a packet from the CE device or a packet sent to the CE device. In an EVPN multi-homing networking multi-active mode, only the DF device can forward broadcast, unknown unicast, and multicast (BUM) traffic packets sent to the CE device.

However, in the multi-active mode, the BUM traffic packets sent to the CE device can be forwarded only by the DF device, resulting in load imbalance of the plurality of PE devices to which the CE device is homed.

SUMMARY

This application provides a packet sending method, device, and system, to resolve a technical problem of load imbalance between a plurality of PE devices in a multi-homing networking mode.

According to a first aspect, a packet sending system is provided. The system includes a first network device, a second network device, and a third network device. The first network device and the second network device are load sharing devices for each other when forwarding packets to the third network device, and the third network device is multi-homed to the first network device and the second network device. The first network device is configured to receive a first packet and a second packet, and forward the first packet to the third network device based on that the first network device is a device that needs to forward the first packet in a load sharing manner; and the second network device is configured to receive the first packet and the second packet, and forward the second packet to the third network device based on that the second network device is a device that needs to forward the second packet in a load sharing manner.

Compared with forwarding a packet by only a DF device, forwarding packets by the first network device and the second network device in a load sharing manner in a solution provided in this application can ensure that load of the first network device and load of the second network device are balanced.

Optionally, that the first network device forwards the first packet to the third network device based on that the first network device is a device that needs to forward the first packet in a load sharing manner includes: determining, by first network device based on that the first packet meets a first condition, that the first network device is a device that needs to forward the first packet in a load sharing manner; and that the second network device forwards the second packet to the third network device based on that the second network device is a device that needs to forward the second packet in a load sharing manner includes: determining, by the second network device based on that the second packet meets a second condition, that the second network device is a device that needs to forward the second packet in a load sharing manner.

The first condition is different from the second condition. To be specific, the first network device and the second network device can respectively forward packets that meet different conditions. The mode in which the first network device and the second network device forward packets in a load sharing manner based on the first condition and the second condition may also be referred to as a target load sharing mode.

Optionally, that the first packet meets the first condition includes: A first target media access control (MAC) address of the first packet is a MAC address that meets a third condition, and the first target MAC address is a source MAC address or a destination MAC address of the first packet. That the second packet meets the second condition includes: A second target MAC address of the second packet is a MAC address that meets a fourth condition, and the second target MAC address is a source MAC address or a destination MAC address of the second packet. The third condition is different from the fourth condition.

In the solution provided in this application, the first network device and the second network device may determine, based on a target MAC address of a packet, a packet that needs to be forwarded in a load sharing manner. Certainly, the first network device and the second network device may alternatively determine, based on another parameter of a packet, for example, a timestamp, a packet that needs to be forwarded in a load sharing manner.

Optionally, the third condition is that an $i^{th}$ bit of a MAC address is one of an odd number and an even number, and the fourth condition is that the $i^{th}$ bit of the MAC address is the other of the odd number and the even number, where i is a positive integer, and i is not greater than a total quantity of bits of the MAC address; or the third condition is that a value formed by n bits in a MAC address is within a first value range, and the fourth condition is that the value formed by the n bits in the MAC address is within a second value range, where the second value range is different from the first value range, n is a positive integer greater than 1, and n is not greater than a total quantity of bits of the MAC address.

Optionally, the first network device and the second network device each are a forwarding device, and the third network device is a broadband access server or a forwarding device connected to a broadband access server; and the first target MAC address and the second target MAC address each may be a source MAC address.

In this scenario, the packets forwarded to the third network device by the first network device and the second network device are mainly dial-up packets of a user terminal, and the dial-up packets are broadcast packets (destination MAC addresses of the broadcast packets are usually all Fs). Therefore, the target MAC addresses may be source MAC addresses. That is, the first network device and the second network device may perform load sharing forwarding on the packets based on the source MAC addresses of the broadcast packets.

Optionally, the first network device and the second network device each are a PE device, the third network device is a CE device, and the first target MAC address and the second target MAC address each are a destination MAC address.

In this scenario, senders of the packets forwarded to the third network device by the first network device and the second network device are relatively centralized. For example, most senders of the packets are broadband access servers. Therefore, the target MAC addresses may be destination MAC addresses. That is, the first network device and the second network device may perform load sharing forwarding on the packets (for example, unknown unicast packets and multicast packets) based on the destination MAC addresses of the packets.

Optionally, the first network device is further configured to obtain a first indication, and determine, according to the first indication, that the first network device is a load sharing device that forwards the first packet to the third network device; and the second network device is further configured to obtain a second indication, and determine, according to the second indication, that the second network device is a load sharing device that forwards the second packet to the third network device.

Optionally, that the first network device obtains the first indication includes: receiving, by the first network device, a first Ethernet segment (ES) route that carries the first indication and that is sent by the second network device; and that the second network device obtains the second indication includes: receiving, by the second network device, a second ES route that carries the second indication and that is sent by the first network device, where the second indication is the same as the first indication.

The first network device and the second network device send ES routes to each other after establishing a neighbor relationship. Therefore, an additional increase in a quantity of messages that need to be sent by the first network device and the second network device can be avoided by carrying the indications in the ES routes. In addition, impact on normal message processing of the network devices can be avoided, that is, message identification and processing behaviors of the network devices do not need to be changed.

Optionally, the system may further include a controller. The controller is configured to send the first indication to the first network device and send the second indication to the second network device.

Optionally, the first network device is further configured to forward, according to an obtained disable instruction, the first packet to the third network device without performing load sharing with the second network device; and the second network device is further configured to forward, based on the obtained disable instruction, the second packet to the third network device without performing load sharing with the first network device.

After disabling load sharing functions according to the obtained disable instruction, the first network device and the second network device may restore roles of original DF devices or non-DF devices. That is, a selected DF device may continue to forward a packet to the third network device. The disable instruction is used to disable the load sharing functions of the network devices, so that flexibility of the network devices during operation can be effectively improved, to meet requirements of different application scenarios.

Optionally, the first network device and the second network device are located in an EVPN, and the third network device is a device that accesses the EVPN.

Optionally, the first packet and the second packet may be BUM traffic packets.

According to a second aspect, a packet sending method is provided, applied to a packet sending system. The packet sending system includes a first network device, a second network device, and a third network device. The first network device and the second network device are load sharing devices for each other when forwarding packets to the third network device, and the third network device is multi-homed to the first network device and the second network device. The method includes: The first network device receives a first packet; and the first network device forwards the first packet to the third network device on an access side based on that the first network device is a device that needs to forward the first packet in a load sharing manner.

Compared with forwarding a packet by only a DF device, forwarding packets by the first network device and the second network device in a load sharing manner in the method provided in this application can ensure that load of the first network device and load of the second network device are relatively balanced.

Optionally, before that the first network device receives a first packet, the method may further include: The first network device obtains a first indication, where the first indication is used to indicate that the first network device is a load sharing device that forwards the first packet to the third network device.

Optionally, a process in which the first network device obtains the first indication may include: The first network device receives the first indication sent by the second network device; the first network device receives the first indication sent by a controller; or the first network device obtains the first indication that is configured.

The first network device may obtain the first indication in a plurality of different manners, and has high flexibility of obtaining the first indication.

Optionally, a process in which the first network device receives the first indication sent by the second network device may include: The first network device receives a first ES route that carries the first indication and that is sent by the second network device, so that the first network device determines that the first network device and the second network device are load sharing devices for each other.

The first network device and the second network device send ES routes to each other after establishing a neighbor relationship. Therefore, an additional increase in a quantity of messages that need to be sent by the second network device can be avoided by carrying the first indication in the ES routes. In addition, impact on normal message processing of the first network device can be avoided, that is, message identification and processing behaviors of the first network device do not need to be changed.

Optionally, a process in which the first network device determines that the first network device and the second network device are load sharing devices for each other may include: The first network device determines, based on that the first indication in the first ES route is the same as a second indication configured in the first network device, that the first network device and the second network device are load sharing devices for each other.

In the solution provided in this application, an operation and maintenance engineer may configure the second indication in the first network device, and configure, in the second network device, the first indication that is the same as the second indication. If the first network device determines that the first indication in the first ES route is the same as the second indication configured in the first network device, the first network device may determine that the first network device and the second network device are load sharing devices for each other, that is, the first network device and the second network device are peer DF devices, and a packet forwarding function in a load sharing manner can be further enabled. The peer DF devices herein actually mean that compared with a conventional implementation in which only a DF device is specified to forward BUM traffic to a network device on an access side, a plurality of network devices multi-homed to the network device on the access each may forward BUM traffic to the network device on the access side, to form a plurality of load sharing devices, and the plurality of load sharing devices may be referred to as a plurality of peer DF devices. It should be noted that, in a possible case, some (more than one) of the plurality of network devices multi-homed to the network device on the access side may form the peer DF devices.

Optionally, the method may further include: The first network device sends, to the second network device, a second ES route that carries the second indication. The second indication in the second ES route may be used by the second network device to determine whether to forward a packet to the third network device on the access side in a load sharing manner.

Optionally, a process in which the first network device forwards the first packet to the third network device on the access side based on that the first network device is a device that needs to forward the first packet in a load sharing manner may include: determining, based on that the first packet meets a first condition, that the first network device is a device that needs to forward the first packet in a load sharing manner; and forwarding, by the first network device, the first packet to the third network device on the access side. That is, the first network device may forward the first packet that meets the first condition to the third network device. Correspondingly, the second network device may forward the second packet that meets a second condition to the third network device.

Optionally, that the first packet meets the first condition includes: a target MAC address of the first packet meets a third condition; and the second condition may include: a target MAC address of the second packet meets a fourth condition. The target MAC address is a source MAC address or a destination MAC address of the packet.

The first condition may be determined by the first network device based on a locally configured load sharing policy. Alternatively, the first condition may be directly configured in the first network device by an operation and maintenance engineer. Alternatively, the first indication obtained by the first network device may be further used to indicate the first condition. Alternatively, the first condition may be sent by the second network device or the controller.

Optionally, before that the first network device determines, based on that the first packet meets the first condition, that the first network device is a device that needs to forward the first packet in a load sharing manner, the method may further include: The first network device determines that a difference between a quantity of MAC addresses that meet the third condition in a plurality of obtained MAC addresses and a quantity of MAC addresses that meet the fourth condition in the plurality of obtained MAC addresses is less than a difference threshold, where the fourth condition is used to indicate the second network device to determine, based on the fourth condition, a packet that needs to be forwarded in a load sharing manner, and the fourth condition is different from the third condition.

The MAC addresses obtained by the first network device may be MAC addresses learned by the first network device, or may be MAC addresses of user terminals that have gone online in a metropolitan area network. The first network device determines the third condition and the fourth condition based on a distribution rule of the obtained MAC addresses, so that load of the first network device and load of the second network device can be balanced during packet forwarding in load sharing manner.

Optionally, the third condition may be that an $i^{th}$ bit of a MAC address is one of an odd number and an even number, and the fourth condition may be that the $i^{th}$ bit of the MAC address is the other of the odd number and the even number, where i is a positive integer, and i is not greater than a total quantity of bits of the MAC address; or the third condition may be that a value formed by n bits in a MAC address is within a first value range, and the fourth condition may be that the value formed by the n bits in the MAC address is within a second value range, where the second value range is different from the first value range, n is a positive integer greater than 1, and n is not greater than a total quantity of bits of the MAC address.

In the solution provided in this application, a target load sharing mode used when the first network device and the second network device forward packets in a load sharing manner may be determined based on a distribution rule of a specific bit in a MAC address or a distribution rule of a value formed by n bits in the MAC address, thereby effectively improving flexibility of determining the target load sharing mode.

Optionally, the first network device and the second network device each are a forwarding device, the third network device is a broadband access server or a forwarding device connected to a broadband access server; and the target MAC addresses are source MAC addresses.

In this scenario, the packets forwarded to the third network device by the first network device and the second network device are mainly dial-up packets of a user terminal, and the dial-up packets are broadcast packets (destination MAC addresses of the broadcast packets are usually all Fs). Therefore, the target MAC addresses may be source MAC addresses. That is, the first network device and the second network device may perform load sharing forwarding on the packets based on the source MAC addresses of the broadcast packets.

Optionally, the first network device and the second network device each are a PE device, the third network device is a CE device, and the target MAC addresses are destination MAC addresses.

In this scenario, senders of the packets forwarded to the third network device by the first network device and the second network device are relatively centralized. For example, most senders of the packets are broadband access servers. Therefore, the target MAC addresses may be destination MAC addresses. That is, the first network device and the second network device may perform load sharing forwarding on the packets (for example, unknown unicast packets and multicast packets) based on the destination MAC addresses of the packets.

Optionally, the method may further include: The first network device receives a second packet; and the first network device skips forwarding the second packet to the third network device on the access side based on that the first network device is not a device that needs to forward the second packet in a load sharing manner. The second packet may be forwarded to the third network device by the second network device, and the second network device may not forward the first packet to the third network device on the access side based on that the second network device is not a device that needs to forward the first packet in a load sharing manner.

Optionally, the method may further include: The first network device forwards, according to an obtained disable instruction, a packet to the third network device without performing load sharing with the second network device.

After disabling a load sharing function according to the obtained disabling instruction, the first network device may restore a role of an original DF device or a non-DF device. That is, a selected DF device may continue to forward a BUM packet to the third network device. The disable instruction is used to disable the load sharing function of the first network device, so that flexibility of the first network device during operation can be effectively improved, to meet requirements of different application scenarios.

Optionally, the first packet and the second packet each may be a BUM packet.

According to a third aspect, a packet sending method is provided, applied to a packet sending system. The packet sending system includes a first network device, a second network device, and a third network device. The first network device and the second network device are load sharing devices for each other when forwarding packets to the third network device, and the third network device is multi-homed to the first network device and the second network device. The method includes: The second network device sends a first indication to the first network device, where the first indication is used to indicate that the first network device is a load sharing device that forwards a first packet to the third network device; and the second network device receives a second packet, and forwards the second packet to the third network device on an access side based on that the second network device is a device that needs to forward the second packet in a load sharing manner.

The first indication may be configured in the second network device by an operation and maintenance engineer in a command line mode. The second network device forwards, according to the first indication, a packet to the third network device by performing load sharing with the first network device, so that load of the first network device and load of the second network device can be balanced.

Optionally, that the second network device sends a first indication to the first network device includes: The second network device sends, to the first network device, a first ES route that carries the first indication.

The first network device and the second network device send ES routes to each other after establishing a neighbor relationship. Therefore, an additional increase in a quantity of messages that need to be sent by the second network device can be avoided by carrying the first indication in the ES routes. In addition, impact on normal message processing of the first network device can be avoided, that is, message identification and processing behaviors of the first network device do not need to be changed.

Optionally, the method further includes: The second network device receives a second ES route sent by the first network device; and the second network device determines, based on that the second ES route carries a second indication, that the second network device and the first network device are load sharing devices for each other, where the second indication is the same as the first indication.

If the second network device determines that the second ES route carries the second indication that is the same as the first indication, the second network device may determine that the second network device and the first network device are load sharing devices for each other, that is, the second network device and the first network device are peer DF devices, and a packet forwarding function a load sharing manner can be further enabled.

Optionally, a process in which the second network device forwards the second packet to the third network device on the access side based on that the second network device is a device that needs to forward the second packet in a load sharing manner may include: The second network device determines, based on that the received second packet meets a condition, that the second network device is a device that needs to forward the second packet in a load sharing manner; and the second network device forwards the second packet to the third network device on the access side.

The condition may be determined by the second network device based on a locally configured load sharing policy. Alternatively, the condition may be directly configured in the second network device by the operation and maintenance engineer. Alternatively, the second indication carried in the second ES route may be further used to indicate the condition. Alternatively, the condition may be sent by the first network device or a controller.

Optionally, the method may further include: The second network device receives the first packet; and the second network device skips forwarding the first packet to the third network device on the access side based on that the second network device is not a device that needs to forward the first packet in a load sharing manner.

According to a fourth aspect, a packet sending method is provided, and is applied to a packet sending system. The packet sending system includes a first network device, a second network device, a third network device, and a controller. The first network device and the second network device are load sharing devices for each other when forwarding packets to the third network device, and the third network device is multi-homed to the first network device and the second network device. The method includes: The controller sends a first indication to the first network device, and sends a second indication to the second network device, where the first indication is used to indicate that the first network device is a load sharing device that forwards a first packet to the third network device, and the second indication is used to indicate that the second network device is a load sharing device that forwards a second packet to the third network device.

The first network device and the second network device may forward the packets to the third network device in a load sharing manner under the indication of the controller. Compared with forwarding a packet by only a DF device, the solution provided in this application can ensure that load of the first network device and load of the second network device are relatively balanced.

Optionally, the first indication is used to indicate the first network device to forward the first packet that meets a first condition to the third network device, and the second indication is used to indicate the second network device to forward the second packet that meets a second condition to the third network device. Alternatively, the method may further include: The controller sends a third indication to the first network device, and sends a fourth indication to the second network device, where the third indication is used to indicate the first network device to forward a first packet that meets a first condition to the third network device, and the fourth indication is used to indicate the second network device to forward a second packet that meets a second condition to the third network device. The first condition is different from the second condition.

In the solution provided in this application, the controller may directly indicate the first condition by using the first indication, and indicate the second condition by using the second indication, so that a quantity of indications that need to be sent by the controller can be reduced, and efficiency of indicating a network device to perform load sharing can be improved. Alternatively, the controller may indicate the first condition by using a separate third indication, and indicate the second condition by using a separate fourth indication, so that the first condition and the second condition can be conveniently adjusted, thereby improving flexibility of load sharing.

Optionally, both the first network device and the second network device may be located in an EVPN, and the third network device is a device that accesses the EVPN.

According to a fifth aspect, a first network device is provided, applied to a packet sending system. The packet sending system further includes a second network device and a third network device. The first network device and the second network device are load sharing devices for each other when forwarding packets to the third network device, and the third network device is multi-homed to the first network device and the second network device. The first network device includes:

a receiving module, configured to receive a first packet; and a forwarding module, configured to forward the first packet to the third network device on an access side based on that the first network device is a device that needs to forward the first packet in a load sharing manner.

Optionally, the first network device may further include:

an obtaining module, configured to obtain a first indication, where the first indication is used to indicate that the first network device is a load sharing device that forwards the first packet to the third network device.

Optionally, the obtaining module is configured to receive the first indication sent by the second network device, receive the first indication sent by a controller, or obtain the first indication that is configured.

Optionally, the obtaining module is configured to receive a first ES route that carries the first indication and that is sent by the second network device, so that the first network device determines that the first network device and the second network device are load sharing devices for each other.

Optionally, the forwarding module is configured to determine, based on that the first indication in the first ES route is the same as a second indication configured in the first network device, that the first network device and the second network device are load sharing devices for each other.

Optionally, the first network device may further include:

a sending module, configured to send, to the second network device, a second ES route that carries the second indication.

Optionally, the forwarding module is configured to: determine, based on that the first packet meets a first condition, that the first network device is a device that needs to forward the first packet in a load sharing manner; and forward the first packet to the third network device on the access side.

Optionally, that the first packet meets the first condition includes: A target MAC address of the first packet meets a third condition, and the target MAC address is a source MAC address or a destination MAC address of the first packet.

Optionally, the first network device may further include:

a determining module, configured to: before the forwarding module determines that the first network device is a device that needs to forward the first packet in a load sharing manner, determine that a difference between a quantity of MAC addresses that meet the third condition in a plurality of obtained MAC addresses and a quantity of MAC addresses that meet a fourth condition in the plurality of obtained MAC addresses is less than a difference threshold, where the fourth condition is used to indicate the second network device to determine, based on the fourth condition, a packet that needs to be forwarded in a load sharing manner, and the fourth condition is different from the third condition.

Optionally, the third condition is that an $i^{th}$ bit of a MAC address is one of an odd number and an even number, and the fourth condition is that the $i^{th}$ bit of the MAC address is the other of the odd number and the even number, where i is a positive integer, and i is not greater than a total quantity of bits of the MAC address; or the third condition is that a value formed by n bits in a MAC address is within a first value range, and the fourth condition is that the value formed by the n bits in the MAC address is within a second value range, where the second value range is different from the first value range, n is a positive integer greater than 1, and n is not greater than a total quantity of bits of the MAC address.

Optionally, the first network device and the second network device each are a forwarding device, the third network device is a broadband access server or a forwarding device connected to a broadband access server; and the target MAC address is the source MAC address.

Optionally, the first network device and the second network device each are a PE device, the third network device is a CE device, and the target MAC address is the destination MAC address.

Optionally, the receiving module may be further configured to receive a second packet; and the forwarding module may be further configured to skip forwarding the second packet to the third network device on the access side based on that the first network device is not a device that needs to forward the second packet in a load sharing manner.

Optionally, the forwarding module may be further configured to forward, according to an obtained disable instruction, a packet to the third network device without performing load sharing with the second network device.

Optionally, the first packet and the second packet each may be a BUM packet.

According to a sixth aspect, a second network device is provided, applied to a packet sending system. The packet sending system further includes a first network device and a third network device. The first network device and the second network device are load sharing devices for each other when forwarding packets to the third network device, and the third network device is multi-homed to the first network device and the second network device. The second network device includes:

a sending module, configured to send a first indication to the first network device, where the first indication is used to indicate that the first network device is a load sharing device that forwards a first packet to the third network device;

a first receiving module, configured to receive a second packet; and a forwarding module, configured to forward the second packet to the third network device on an access side based on that the second network device is a device that needs to forward the second packet in a load sharing manner.

Optionally, the sending module is configured to send, to the first network device, a first ES route that carries the first indication.

Optionally, the second network device may further include:

a second receiving module, configured to receive a second ES route sent by the first network device; and a determining module, configured to determine, based on that the second ES route carries a second indication, that the second network device and the first network device are load sharing devices for each other, where the second indication is the same as the first indication.

Optionally, the forwarding module is configured to: determine, based on that the second packet meets a condition, that the second network device is a device that needs to forward the second packet in a load sharing manner; and forward the second packet to the third network device on the access side.

Optionally, the forwarding module may be further configured to forward, according to an obtained disable instruction, a packet to the third network device without performing load sharing with the first network device.

According to a seventh aspect, a controller is provided, applied to a packet sending system. The packet sending system further includes a first network device, a second network device, and a third network device. The first network device and the second network device are load sharing devices for each other when forwarding packets to the third network device, and the third network device is multi-homed to the first network device and the second network device. The controller includes:

a sending module, configured to send a first indication to the first network device, and send a second indication to the second network device, where the first indication is used to indicate that the first network device is a load sharing device used when forwarding a first packet to the third network device, and the second indication is used to indicate that the second network device is a load sharing device when forwarding a second packet to the third network device.

Optionally, the first indication is used to indicate the first network device to forward the first packet that meets a first condition to the third network device, and the second indication is used to indicate the second network device to forward the second packet that meets a second condition to the third network device.

Alternatively, the sending module is further configured to send a third indication to the first network device, and send a fourth indication to the second network device, where the third indication is used to indicate the first network device to forward the first packet that meets a first condition to the third network device, and the fourth indication is used to indicate the second network device to forward the second packet that meets a second condition to the third network device. The first condition is different from the second condition.

Optionally, the first network device and the second network device are located in an EVPN, and the third network device is a device that accesses the EVPN.

According to an eighth aspect, a device is provided. The device may be the first network device, the second network device, or the controller provided in the foregoing aspects. The device includes a memory and a processor. The memory is configured to store a computer program. The processor is configured to execute the computer program stored in the memory to implement the packet sending method provided in any one of the foregoing aspects.

According to a ninth aspect, a computer-readable storage medium is provided. The computer-readable storage medium stores instructions, and the instructions are executed by a processor to implement the packet sending method provided in any one of the foregoing aspects.

According to a tenth aspect, a computer program product including instructions is provided. When the computer program product runs on a computer, the computer is enabled to perform the packet sending method provided in any one of the foregoing aspects.

According to an eleventh aspect, a communication system is provided. The communication system includes a first network device, a second network device, and a third network device. The third network device is multi-homed to the first network device and the second network device, and the first network device is the device provided in the fifth aspect or the eighth aspect.

Optionally, the second network device is the device provided in the sixth aspect or the eighth aspect. Alternatively, the communication system further includes a controller, and the controller is the device provided in the seventh aspect or the eighth aspect.

Optionally, the first network device and the second network device each are a forwarding device, and the third network device is a broadband access server or a forwarding device connected to a broadband access server; or the first network device and the second network device each are a PE device, and the third network device is a CE device.

In conclusion, embodiments of this application provide a packet sending method, device, and system. In a scenario in which the third network device is multi-homed to the first network device and the second network device, the first network device and the second network device may forward packets to the third network device in a load sharing manner. Compared with that forwarding a packet by only a DF device, forwarding packets by the first network device and the second network device in a load sharing manner can ensure that load of the first network device and load of the second network device are relatively balanced. In some possible specific application scenarios, it may be further ensured that load of boards that are in the third network device and that are connected to the first network device and the second network device is also relatively balanced.

DETAILED DESCRIPTION OF ILLUSTRATIVE EMBODIMENTS

With reference to the accompanying drawings, the following describes in detail a packet sending method, device, and system provided in embodiments of this application.

It should be understood that "at least one" mentioned in this specification means one or more and "a plurality of" means two or more. In descriptions of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

Before embodiments of this application are described, an application scenario of embodiments of this application is first described.

Figure 1:
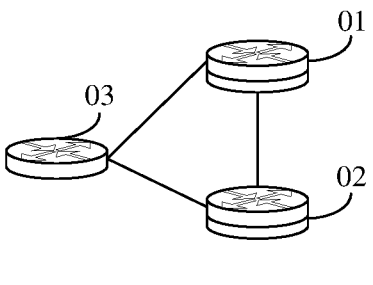
FIG. 1 is a schematic diagram of a structure of a packet sending system according to an embodiment of this application.

FIG. 1 is a schematic diagram of a packet sending system according to an embodiment of this application. As shown in FIG. 1, the system may include a first network device 01, a second network device 02, and a third network device 03. The first network device 01 and the second network device 02 are load sharing devices for each other when forwarding packets to the third network device 03, and the third network device 03 can be multi-homed to the first network device 01 and the second network device 02 as an access side device.

It should be understood that this application scenario may further include another network device, and the third network device 03 may be multi-homed to the another network device as an access side device. That is, a quantity of network devices to which the third network device 03 is multi-homed may be greater than or equal to 2.

In this embodiment of this application, all the network devices (including the first network device 01 and the second network device 02) to which the third network device 03 is multi-homed may be located in an EVPN, that is, the third network device 03 is a device that accesses the EVPN. For example, the foregoing application scenario may be a metropolitan area network that uses the EVPN to carry services such as home broadband services and government and enterprise services. A traditional metropolitan area network usually uses a layer 2 virtual local area network (VLAN) or a virtual private LAN service (VPLS) network. After the traditional metropolitan area network is reconstructed or constructed, an EVPN can be used to replace the layer 2 VLAN or the VPLS network, and intelligent scheduling and the like are implemented based on this.

Figure 2:
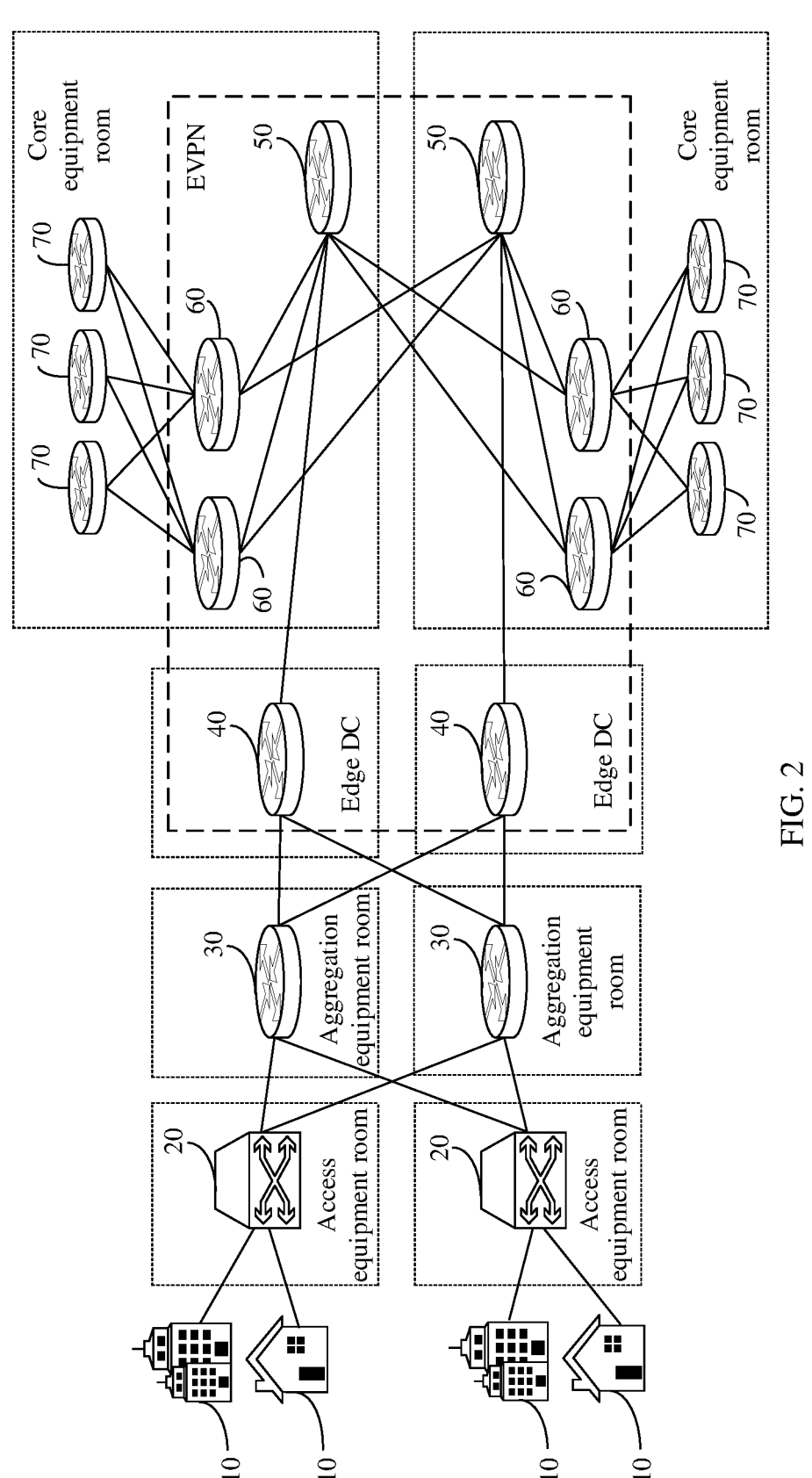
FIG. 2 is a schematic diagram of a structure of a metropolitan area network using an EVPN according to an embodiment of this application.

FIG. 2 is a schematic diagram of a structure of a metropolitan area network using an EVPN according to an embodiment of this application. As shown in FIG. 2, the metropolitan area network may include: a user terminal 10, a forwarding device 20 located in an access equipment room, a forwarding device 30 located in an aggregation equipment room, a forwarding device 40 located in an edge data center (DC), forwarding devices 50 and 60 located in a core equipment room, and a broadband access server (BAS) 70 located in the core equipment room.

The forwarding device 40 located in the edge DC and the forwarding devices 50 and 60 located in the core equipment room all belong to the EVPN. In addition, the forwarding device 40 located in the edge DC may be an access leaf node, the forwarding device 50 located in the core equipment room may be a spine node, and the forwarding device 60 located in the core equipment room may be a service leaf node. The BAS 70 serves as an access side device of the EVPN, and may be connected to the forwarding device 60. Optionally, the BAS 70 may be directly connected to the forwarding device 60, or may be connected to the forwarding device 60 by using a service router (SR). The service router may be a layer 3 router having a dynamic host configuration protocol (DHCP) relay function. The BAS 70 may be a broadband remote access server (BRAS), or may be an UP device in a BRAS of which a control plane (CP) and a user plane (UP) are separately deployed.

Each forwarding device in the scenario shown in FIG. 2 may be a device having a packet forwarding function, for example, a router or a switch. For example, the switching device 20 located in the access equipment room may be a switch (SW), an optical line terminal (OLT), or a digital subscriber line access multiplexer (DSLAM). The user terminal 10 may also be referred to as a host or user equipment, and the user terminal 10 may be a computer, a wireless terminal device, a virtual machine (VM) created on a server, or the like.

It can be learned, with reference to FIG. 2, that the user terminal 10 may go online on the BAS 70 by passing through the layer 2 EVPN through the forwarding device 20 and the forwarding device 30, or may go online on a far-end BAS 70 through a layer 3 service router. In the metropolitan area network using the EVPN, to ensure reliability, the BAS 70 or the service router, as an access side device of the EVPN, is usually multi-homed to a plurality of forwarding devices 60 located at an edge of the EVPN. For example, each BAS 70 in FIG. 2 is dual-homed to two forwarding devices 60. An interface, of the BAS 70 or the service router, accessing the EVPN is usually an inter-board trunk interface. After the metropolitan area network is reconstructed into an EVPN multi-homing multi-active (for example, dual-homing active-active) architecture, a member interface of trunk interfaces is connected to the plurality of forwarding devices 60.

To prevent a waste of network resources caused by receiving, by an access side device, repeated traffic from a plurality of forwarding devices (which may also be referred to as edge side devices) located at the edge of the EVPN, a DF device selection mechanism is introduced into the EVPN. To be specific, one edge side device is specified as a DF device from the plurality of edge side devices that are multi-homed from the access side device. In a multi-homing multi-active networking architecture, only the DF can forward a BUM packet sent to an edge device. An edge side device that is not selected as a DF device may be referred to as a non-DF device. Alternatively, the edge side device that is selected as the DF device may be referred to as an active DF device, and the edge side device that is not selected as the DF device may be referred to as a backup DF device (or a standby DF device).

In the metropolitan area network, a point-to-point protocol over Ethernet (point-to-point protocol over Ethernet, PPPoE) dial-up packet or an Internet protocol over Ethernet (IPoE) dial-up packet that is sent by the user terminal 10 in a process of going online is a broadcast packet, and therefore is sent to the BAS 70 or the service router by using the DF device. Therefore, the BAS 70 or the service router can receive dial-up packets of a plurality of users from only one board, and load of two boards in the BAS 70 or the service router is unbalanced. In addition, because only the DF device can forward a BUM packet (for example, the dial-up packet), load imbalance is caused between the plurality of forwarding devices 60 to which the BAS 70 or the service router is multi-homed.

In the access side device multi-homing networking architecture, each access side device accesses different edge side devices in the EVPN by using a plurality of links, and these links form an ES. The ES may be uniquely identified by using an ESI. That is, ESIs on a plurality of edge side devices connected to a same access side device are the same, and ESIs on edge side devices connected to different access side devices are different. An ESI may be configured on a physical port that is of an edge side device and that is used to connect to an access side device. When an ES route is transmitted between edge devices, the ES route carries ESIs, so that each edge device can sense another edge device connected to a same access device and DF selection is performed. The DF selection may be performed in the following manners:

Manner 1: Each edge side device determines an Internet protocol (Internet protocol, IP) address of another edge side device based on a received ES route, and a plurality of edge side devices with a same ESI are sorted in an order of values of IP addresses. Then, the plurality of edge side devices may select an edge side device with a smallest IP address as a DF device.

Manner 2: The DF selection is performed based on a VLAN. An interface (also referred to as a main interface) that is of each edge side device and that is used to connect to an access side device may be divided into a plurality of sub-interfaces, and the sub-interfaces may be Ethernet virtual circuit (EVC) sub-interfaces. Different sub-interfaces can be configured with different VLANs. Therefore, one DF can be selected for each VLAN. For example, for a VLAN whose identifier is V, a sequence number i of an edge side device that is used as a DF device and that is determined by each edge side device may meet: i=V mod N, where mod represents a modulo operation, i represents the sequence number of the edge side device that is selected as the DF device, and N is a quantity of edge side devices that are multi-homed to the access side device.

It is assumed that in a dual-homing active-active architecture, that is, N=2, a sequence number of an edge side device PE 1 is 0, and a sequence number of an edge side device PE 2 is 1. In this case, for a VLAN whose identifier is 10 (namely, a VLAN 10), because 10 mod 2=0, the edge side device PE 1 is selected as a DF device; and for a VLAN whose identifier is 11 (namely, a VLAN 11), because 11 mod 2=1, the edge side device PE 2 is selected as a DF device.

Manner 3: A DF device is selected by using a highest random weight (HRW) algorithm.

Manner 4: A DF device is selected by using a priority algorithm (refer to a draft: draft-ietf-bess-evpn-pref-df-06).

The foregoing manner 1 to manner 4 respectively provide a method for selecting a DF device based on an interface granularity and a method for selecting a DF device based on a VLAN granularity. However, in essence, a DF device is selected to forward a packet to an access side device. Therefore, device-level load sharing between a plurality of edge side devices cannot be effectively implemented.

An embodiment of this application provides a packet sending method. The method can resolve a problem of load imbalance between a first network device 01 and a second network device 02 after a third network device 03 is multi-homed to the first network device 01 and the second network device 02 as an access side device. For a metropolitan area network using an EVPN, the third network device 03 may be a BAS 70 or a service router connected to a BAS 70. Correspondingly, the first network device 01 and the second network device 02 may be forwarding devices 60 located in a core equipment room.

Alternatively, the third network device 03 may be a CE device configured to connect to a user terminal 10, and the first network device 01 and the second network device 02 each may be a PE device. For example, the CE device may be a forwarding device 20 located in an access equipment room or a forwarding device 30 located in an aggregation equipment room, and the PE device may be a forwarding device 60 located in an edge DC.

The following describes in detail a packet sending method, device, and system provided in embodiments of this application.

As shown in FIG. 1, the packet sending system provided in this embodiment of this application may include the first network device 01, the second network device 02, and the third network device 03. The first network device 01 and the second network device 02 are load sharing devices for each other when forwarding packets to the third network device 03, and the third network device 03 can be multi-homed to the first network device 01 and the second network device 02 as an access side device. Both the first network device 01 and the second network device 02 may be located in the EVPN, the third network device 03 may be a device that accesses the EVPN, and the third network device 03 may be located in the EVPN, or may not be located in the EVPN.

The first network device 01 is configured to receive a first packet and a second packet, and forward the first packet to the third network device 03 based on that the first network device 01 is a device that needs to forward the first packet in a load sharing manner.

The second network device 02 is configured to receive the first packet and the second packet, and forward the second packet to the third network device 03 based on that the second network device 02 is a device that needs to forward the second packet in a load sharing manner.

Because the first network device and the second network device in the system may forward the first packet and the second packet in a load sharing manner, it can be ensured that load of the first network device and load of the second network device are relatively balanced. In some possible specific application scenarios, it may be further ensured that load of boards that are in the third network device and that are connected to the first network device and the second network device is also relatively balanced.

Optionally, a process in which the first network device 01 forwards the first packet to the third network device based on that the first network device 01 is a device that needs to forward the first packet in a load sharing manner may include: The first network device 01 determines, based on that the first packet meets a first condition, that the first network device 01 is a device that needs to forward the first packet in a load sharing manner.

A process in which the second network device 02 forwards the second packet to the third network device based on that the second network device 02 is a device that needs to forward the second packet in a load sharing manner may include: The second network device 02 determines, based on that the second packet meets a second condition, that the second network device 02 is a device that needs to forward the second packet in a load sharing manner.

The first condition is different from the second condition. To be specific, the first network device 01 and the second network device 02 can respectively forward packets that meet different conditions.

Optionally, the first condition may be determined by the first network device 01 according to a locally configured load sharing policy, and the second condition may be determined by the second network device 02 according to the locally configured load sharing policy. Alternatively, the first condition may be directly configured in the first network device 01 by an operation and maintenance engineer, and the second condition may be directly configured in the second network device 02 by the operation and maintenance engineer. Alternatively, the first condition may be sent to the first network device 01 by a controller, and the second condition may be sent to the second network device 02 by the controller. Alternatively, one of the first network device 01 and the second network device 02 may be configured to determine the first condition and the second condition, and may send the determined condition to the other network device.

In this embodiment of this application, the mode in which the first network device and the second network device forward packets in a load sharing manner based on the first condition and the second condition may also be referred to as a target load sharing mode. Correspondingly, it can be learned from the foregoing example that the target load sharing mode may be separately determined by the first network device 01 and the second network device 02, may be configured by the operation and maintenance engineer, may be determined and delivered by the controller, or may be determined and sent to the other network device by one of the first network device 01 and the second network device 02.

Optionally, that the first packet meets the first condition includes: A first target MAC address of the first packet is a MAC address that meets a third condition, and the first target MAC address is a source MAC address or a destination MAC address of the first packet. That the second packet meets the second condition includes: A second target MAC address of the second packet is a MAC address that meets a fourth condition, and the second target MAC address is a source MAC address or a destination MAC address of the second packet, where the third condition is different from the fourth condition.

After receiving the first packet and the second packet, the first network device 01 may determine that the first target MAC address of the first packet meets the third condition, and may determine that the second target MAC address of the second packet does not meet the third condition. Therefore, the first network device 01 may forward the first packet to the third network device 03, and does not need to forward the second packet.

Similarly, after receiving the first packet and the second packet, the second network device 02 may determine that the first target MAC address of the first packet does not meet the fourth condition, and may determine that the second target MAC address of the second packet meets the fourth condition. Therefore, the second network device 02 may forward the second packet to the third network device 03, and does not need to forward the first packet.

In the system provided in this embodiment of this application, in addition to determining, based on a target MAC address of a packet, the packet that needs to be forwarded in a load sharing manner, the first network device and the second network device may alternatively determine, based on another parameter of the packet, for example, a timestamp, the packet that needs to be forwarded in a load sharing manner. This is not limited in this embodiment of this application.

Optionally, the third condition may be that an $i^{th}$ bit of a MAC address is one of an odd number and an even number, and the fourth condition may be that the $i^{th}$ bit of the MAC address is the other of the odd number and the even number, where i is a positive integer, and i is not greater than a total quantity of bits of the MAC address.

Alternatively, the third condition may be that a value formed by n bits in a MAC address is within a first value range, and the fourth condition may be that the value formed by the n bits in the MAC address is within a second value range, where the second value range is different from the first value range, n is a positive integer greater than 1, and n is not greater than a total quantity of bits of the MAC address.

In an optional implementation, as shown in FIG. 2, the first network device 01 and the second network device 02 each may be a forwarding device 60 located in the EVPN, and the third network device 03 may be a BAS 70 or a forwarding device connected to a BAS 70. In this scenario, the packets forwarded to the third network device 03 by the first network device 01 and the second network device 02 are mainly dial-up packets of a user terminal 10, and the dial-up packets are broadcast packets (destination MAC addresses of the broadcast packets are usually all Fs). Therefore, the first target MAC address of the first packet and the second target MAC address of the second packet each may be a source MAC address. That is, the first network device and the second network device may perform load sharing forwarding on the packets based on the source MAC addresses of the broadcast packets.

In another optional implementation, the first network device 01 and the second network device 02 each may be a PE device, and the third network device 03 may be a CE device. For example, as shown in FIG. 2, the first network device 01 and the second network device 02 may be forwarding devices 60 located in an edge DC, and the third network device 03 may be a forwarding device 20 in an access equipment room or a forwarding device 30 located in an aggregation equipment room. In this scenario, senders of the packets forwarded to the third network device 03 by the first network device 01 and the second network device 02 are relatively centralized. For example, most senders of the packets are BASs 70. Therefore, the first target MAC address of the first packet and the second target MAC address of the second packet each may be a destination MAC address. That is, the first network device 01 and the second network device 02 may perform load sharing for-
warding on the packets (for example, unknown unicast
packets and multicast packets) based on the destination
MAC addresses of the packets.

Optionally, the first network device 01 may be further
configured to obtain a first indication, and determine,
according to the first indication, that the first network device
01 is a load sharing device that forwards the first packet to
the third network device 03. The second network device 02
may be further configured to obtain a second indication, and
determine, according to the second indication, that the
second network device 02 is a load sharing device that
forwards the second packet to the third network device 03.

Optionally, a process in which the first network device 01
obtains the first indication may include: The first network
device 01 receives a first ES route that carries the first
indication and that is sent by the second network device 02.
A process in which the second network device 02 obtains the
second indication may include: The second network device
02 receives a second ES route that carries the second
indication and that is sent by the first network device 01. In
this implementation, the first indication and the second
indication may have same content or may have an associa-
tion relationship, so that the first network device 01 and the
second network device 02 may separately determine,
according to the same indication or the indications having
the association relationship, that the other party may be a
network device for load sharing.

Figure 3:
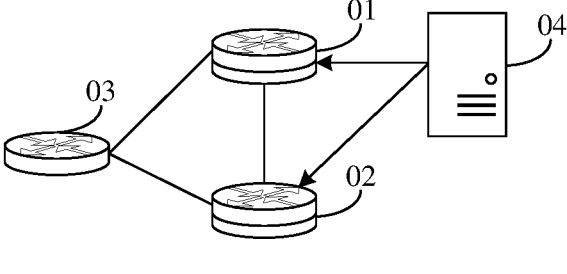
FIG. 3 is a schematic diagram of a structure of another packet sending system according to an embodiment of this application.

Optionally, as shown in FIG. 3, the system may further
include a controller 04. The controller 04 is configured to
send the first indication to the first network device 01 and
send the second indication to the second network device 02.
The controller 04 may be a software-defined networking
(software-defined networking, SDN) controller. In addition,
the controller 01 may be a server, a server cluster including
several servers, or a cloud computing service center.

Optionally, the first network device 01 may be further
configured to forward, according to an obtained disable
instruction, the first packet to the third network device 03
without performing load sharing with the second network
device 02. The second network device 02 may be further
configured to forward, according to the obtained disable
instruction, the second packet to the third network device 03
without performing load sharing with the first network
device 01.

After disabling load sharing functions according to the
obtained disable instruction, the first network device and the
second network device may restore roles of original DF
devices or non-DF devices. That is, a selected DF device
may continue to forward a packet to the third network
device. The disable instruction is used to disable the load
sharing functions of the network devices, so that flexibility
of the network devices during operation can be effectively
improved, to meet requirements of different application
scenarios.

In conclusion, this embodiment of this application pro-
vides a packet sending system. In a scenario in which the
third network device is multi-homed to the first network
device and the second network device, the first network
device and the second network device may forward packets
to the third network device in a load sharing manner.
Compared with forwarding a packet by only a DF device,
forwarding packets by the first network device and the
second network device in a load sharing manner can ensure
that load of the first network device and load of the second
network device are relatively balanced. In some possible
specific application scenarios, it may be further ensured that load of boards that are in the third network device and that
are connected to the first network device and the second
network device is also relatively balanced.

Figure 4:
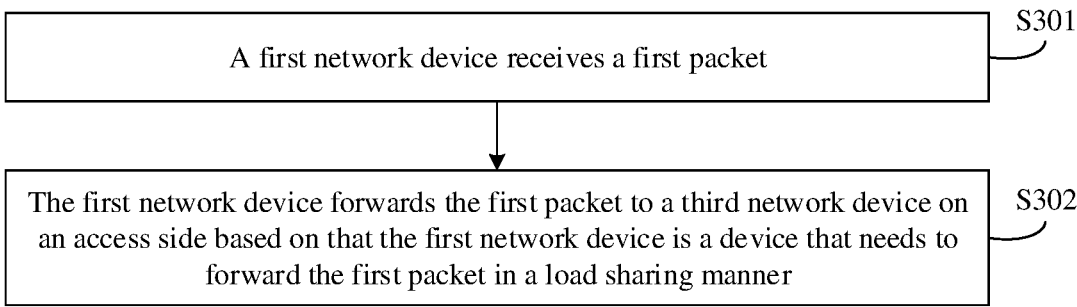
FIG. 4 is a flowchart of a packet sending method according to an embodiment of this application.

FIG. 4 is a flowchart of a packet sending method accord-
ing to an embodiment of this application. The packet send-
ing method may be applied to a first network device 01 in a
packet sending system using a multi-homing multi-active
networking architecture. As shown in FIG. 1, the packet
sending system further includes a second network device 02
and a third network device 03. The first network device 01
and the second network device 02 are load sharing devices
for each other when forwarding packets to the third network
device 03. The third network device 03 is multi-homed to the
first network device 01 and the second network device 02.
The first network device 01 and the second network device
02 may be located in an EVPN, and the third network device
03 may be a device that accesses the EVPN. In the multi-
homing multi-active networking architecture, if a quantity of
network devices to which the third network device 03
multi-homed is greater than 2, the first network device 01
and the second network device 02 may be any two of a
plurality of network devices to which the third network
device 03 is multi-homed. As shown in FIG. 4, the method
includes the following steps.

S301: The first network device receives a first packet.

The first packet may be a packet to be sent to the third
network device. For example, the first packet may be a BUM
packet.

S302: The first network device forwards the first packet to
the third network device on an access side based on that the
first network device is a device that needs to forward the first
packet in a load sharing manner.

In this embodiment of this application, if the first network
device determines that the first network device is a device
that needs to forward the first packet in a load sharing
manner, the first network device may forward the first packet
to the third network device on the access side. For example,
the first network device may determine, according to an
obtained first indication, that the first network device is a
device that needs to forward the first packet in a load sharing
manner. The first indication may be sent by the second
network device, may be sent by a controller that is separately
connected to the first network device and the second net-
work device, or may be directly configured on the first
network device by an operation and maintenance engineer.

In conclusion, this embodiment of this application pro-
vides a packet sending method. In a scenario in which the
third network device is multi-homed to the first network
device and the second network device, the first network
device may forward a packet to the third network device in
a manner of performing load sharing with the second
network device. Compared with forwarding a packet by only
a DF device, forwarding packets by the first network device
and the second network device in a load sharing manner can
ensure that load of the first network device and load of the
second network device are relatively balanced. In some
possible specific application scenarios, it may be further
ensured that load of boards that are in the third network
device and that are connected to the first network device and
the second network device is also relatively balanced.

Figure 5:
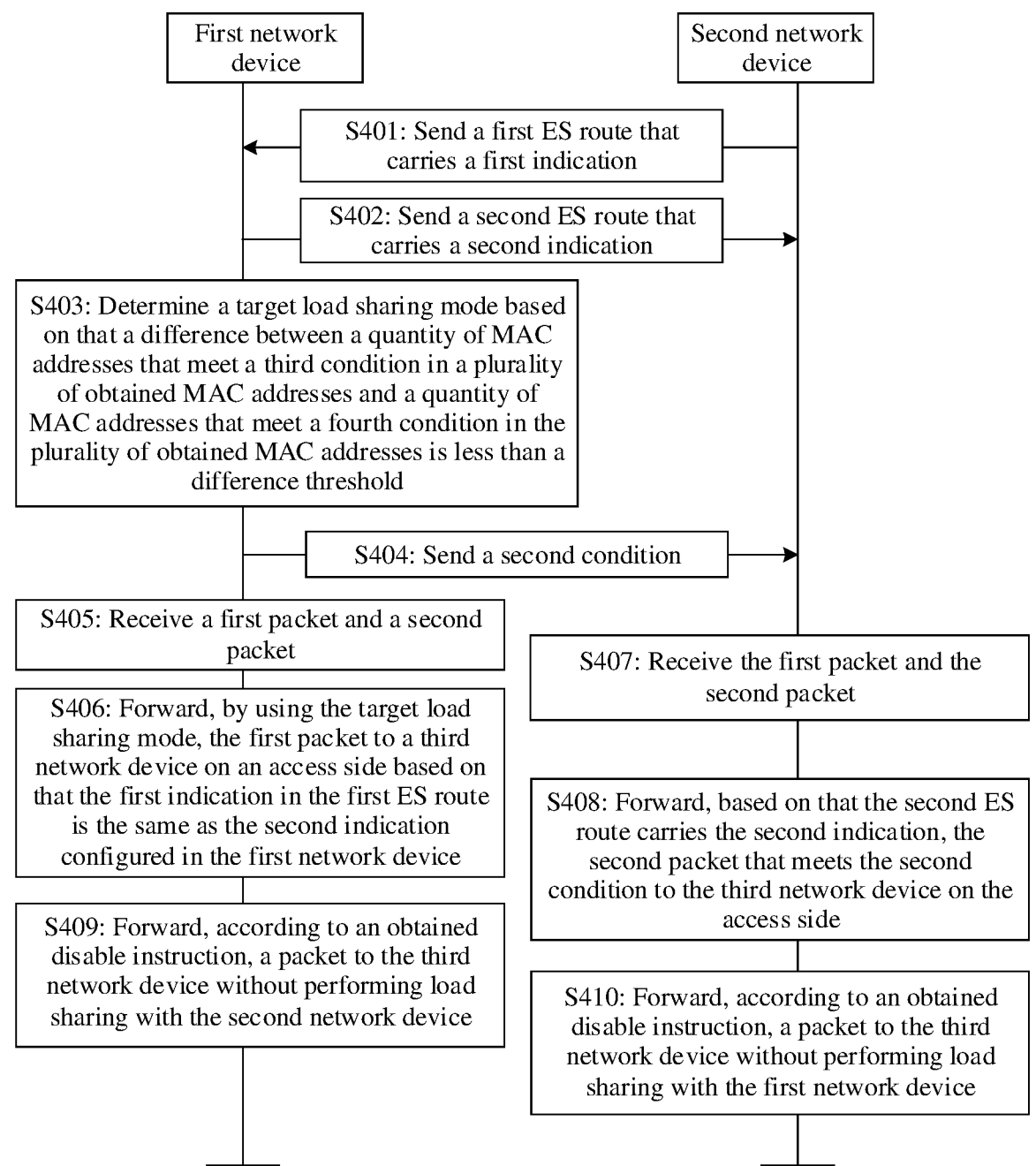
FIG. 5 is a flowchart of another packet sending method according to an embodiment of this application.

FIG. 5 is a flowchart of another packet sending method
according to an embodiment of this application. The packet
sending method may be applied to the network, shown in
FIG. 1, that uses a multi-homing multi-active networking
architecture. For example, the method may be applied to a
metropolitan area network using an EVPN. The following
describes the packet sending method provided in this embodiment of this application by using an example in which a first network device and the second network device send indications to each other. As shown in FIG. 5, the method may include the following steps.

S401: The second network device sends, to the first network device, a first ES route that carries a first indication.

In this embodiment of this application, the first indication may be pre-configured in the second network device, and after establishing a neighbor relationship with the first network device, the second network device may send the first ES route that carries the first indication to the first network device. The first indication may be configured in the second network device by an operation and maintenance engineer in a command line mode, or may be determined and generated by the second network device based on a service principle.

Figure 6:
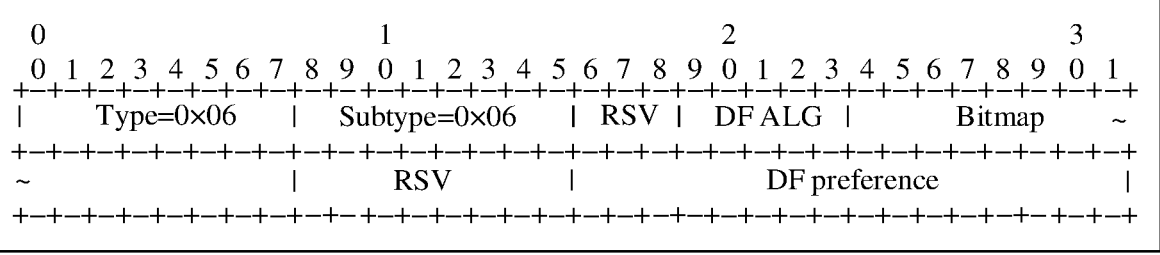
FIG. 6 is a schematic diagram of a data structure of an ES route according to an embodiment of this application.

FIG. 6 is a schematic diagram of a data structure of an ES route according to an embodiment of this application. As shown in FIG. 6, the ES route may include a type field, a subtype field, a reserved (RSV) field, a DF algorithm (DF ALG) field, a bitmap field, and a DF preference field. The DF ALG field is a field used to indicate an algorithm for selecting a DF. For definitions of other fields in the ES route, refer to a request for comments (RFC) document numbered 8584. A value range of the DF ALG field specified in RFC 8584 is 0 to 31. Definitions of different values are as follows:

DF ALG=0: A default DF selection mode is used, or a DF selection mode defined in RFC 7432 (that is, a DF device is selected based on an interface or a VLAN) is used.

DF ALG=1: An HRW algorithm is used.

DF ALG=2: A priority algorithm is used. The priority algorithm can be defined by a draft draft-ietf-bess-evpn-pref-df-06.

DF ALG=3 to 30: Undefined.

DF ALG=31: A value is reserved.

Because meanings of values 3 to 30 of the DF ALG field are not defined, in a possible implementation, in which the first indication is carried, provided in this embodiment of this application, the DF ALG field may be used to carry the first indication, and a value of the first indication is set to any one of 3 to 30. For example, the first indication may be a value 3, and when a value of the DF ALG field is 3, the first indication may indicate to forward a packet in a load sharing manner.

S402: The first network device sends, to the second network device, a second ES route that carries a second indication.

The second indication may also be pre-configured in the first network device. After establishing a neighbor relationship with the second network device, the first network device may send, to the second network device, the second ES route that carries the second indication. For a data structure of the second ES route, refer to FIG. 6. Details are not described herein again.

For example, in this embodiment of this application, the operation and maintenance engineer may separately configure the first network device and the second network device in a command line mode, to indicate the first network device to carry the second indication when the first network device sends an ES route, and indicate the second network device to carry the first indication when the second network device sends an ES route. For example, in a possible implementation of the first indication and the second indication, a value of a DF ALG field in the first ES route sent by the second network device may be 3, and a value of a DF ALG field in the second ES route sent by the first network device may also be 3.

In the method provided in this embodiment of this application, the first network device and the second network device carry indications by using ES routes, so that an additional increase in a quantity of messages that need to be sent by a network device can be avoided. In addition, impact on normal message processing of a network device can be avoided, that is, message identification and processing behaviors of the network device do not need to be changed.

S403: The first network device determines a target load sharing mode based on that a difference between a quantity of MAC addresses that meet a third condition in a plurality of obtained MAC addresses and a quantity of MAC addresses that meet a fourth condition in the plurality of obtained MAC addresses is less than a difference threshold.

In this embodiment of this application, the first network device may collect statistics about a distribution rule of the plurality of MAC addresses obtained by the first network device. If the first network device detects that the difference between the quantity of the MAC addresses that meet the third condition in the plurality of MAC addresses and the quantity of the MAC addresses that meet the fourth condition is less than the difference threshold in the plurality of MAC addresses (that is, quantities of MAC addresses that meet different conditions are relatively close), the first network device determines the target load sharing mode that is referenced when the first network device forwards a packet in a load sharing manner. In addition, to ensure reliability of the determined target load sharing mode, the first network device may further determine the target load sharing mode based on the distribution rule of the plurality of MAC addresses when a quantity of the plurality of obtained MAC addresses is greater than a preset quantity threshold.

The target load sharing mode may include: The first network device forwards a first packet that meets a first condition, and the second network device forwards a second packet that meets a second condition. The first condition may include: A first target MAC address of the first packet is a MAC address that meets the third condition. The second condition may include: A second target MAC address of the second packet is a MAC address that meets the fourth condition. The first target MAC address and the second target MAC address each may be a source MAC address of a packet, or each may be a destination MAC address of a packet. The difference threshold may be a fixed value prestored in the first network device. Alternatively, the difference threshold may be determined by the first network device based on the quantity of the plurality of MAC addresses obtained by the first network device. For example, the difference threshold may be 10% of the total quantity of the plurality of MAC addresses obtained by the first network device.

In a first optional implementation, the third condition may be that an $i^{th}$ bit of a MAC address is one of an odd number and an even number, and the fourth condition may be that the $i^{th}$ bit of the MAC address is the other of the odd number and the even number, where i is a positive integer and is not greater than a total quantity of bits of the MAC address, and the total quantity of bits may be 48.

Optionally, the first network device may sequentially detect, starting from a last bit of a MAC address, whether a difference between a quantity of MAC addresses of which each bit is an odd number and a quantity of MAC addresses of which each bit is an even number in the plurality of MAC addresses is less than the difference threshold. When detecting that a difference between a quantity of MAC addresses of which any bit is an odd number and a quantity of MAC addresses of which any bit is an even number in the plurality of MAC addresses is less than the difference threshold, the first network device may stop detection and determine the target load sharing manner.

For example, it is assumed that the first network device obtains 1000 MAC addresses, and the difference threshold is 100. The first network device may first detect an odd-even distribution rule of last bits of the 1000 MAC addresses. If the first network device detects that last bits of 300 MAC addresses are odd numbers and last bits of 700 MAC addresses are even numbers, because a difference between quantities of the two is greater than the difference threshold 100, the first network device may continue to detect an odd-even distribution rule of penultimate bits of the 1000 MAC addresses. If the first network device detects that penultimate bits of 480 MAC addresses are odd numbers and penultimate bits of 520 MAC addresses are even numbers, because a difference between quantities of the two is less than the difference threshold 100, the first network device may stop detection. In addition, the first network device may determine that the third condition is that a penultimate bit of a MAC address is one of an odd number and an even number, and the fourth condition is that the penultimate bit of the MAC address is the other of the odd number and the even number.

In a second optional implementation, the third condition may be that a value formed by n bits in a MAC address is within a first value range; and the fourth condition may be that the value formed by the n bits in the MAC address is within a second value range. The second value range is different from the first value range, n is a positive integer greater than 1, and n is not greater than a total quantity of bits of the MAC address. In addition, quantities of selectable values included in the two value ranges may be the same.

Optionally, the n bits may be n consecutive bits in the MAC address, or may be n inconsecutive bits. This is not limited in this embodiment of this application. In an example in which the n bits are consecutive n bits, the first network device may sequentially detect, starting from n bits at the end of a MAC address, whether a difference between a quantity of MAC addresses of which every n bits are within the first value range and a quantity of MAC addresses of which every n bits are within the second value range in the plurality of MAC addresses is less than the difference threshold. When detecting that a difference between a quantity of MAC addresses of which any n bits are within the first value range and a quantity of MAC addresses of which any n bits are within the second value range in the plurality of MAC addresses is less than the difference threshold, the first network device may stop detection and determine the target load sharing manner.

In an example in which a value of each bit in a MAC address is 0 or 1 and n=2, the first value range may be {00, 01}, and the second value range may be {10, 11}. Alternatively, the first value range may be {00, 10}, and the second value range may be {01, 11}.

In this embodiment of this application, the first network device may first determine the target load sharing mode by using the foregoing first optional implementation. If the target load sharing mode cannot be determined based on the implementation, the second optional implementation may be used to determine the target load sharing mode.

For example, when a quantity of MAC addresses is large, a ratio of a quantity of target MAC addresses of which last bits are odd numbers to a quantity of target MAC address of which last bits are even numbers may be approximately 1:1. In this case, in a possible case, the target load sharing mode may be directly set to a mode in which load sharing is performed based on odd and even numbers of last bits of the MAC addresses. In another possible case, in target MAC addresses of a packet sent to a third network device in the network, a ratio of a quantity of target MAC addresses of which last bits are odd numbers to a quantity of target MAC address of which last bits are even numbers may not necessarily meet approximately 1:1. Therefore, if load sharing is performed based on a pre-configured fixed target load sharing mode, load imbalance may still occur between the first network device and the second network device. However, in the solution provided in this embodiment of this application, the first network device may determine the target load sharing mode based on a distribution rule of actually obtained MAC addresses. In this way, it can be ensured that when packets are forwarded based on the target load sharing mode, a quantity of packets forwarded by the first network device is relatively close to a quantity of packets forwarded by the second network device, that is, load of the first network device and load of the second network device are relatively balanced.

In one aspect, as shown in FIG. 2, the first network device and the second network device each may be a forwarding device 60 located in the EVPN, and the third network device 03 may be a BAS 70 or a forwarding device connected to a BAS 70. In this scenario, the plurality of MAC addresses obtained by the first network device may be MAC addresses of online user terminals. In addition, the target MAC address may be a source MAC address.

In another aspect, the first network device and the second network device each may be a PE device, and the third network device may be a CE device. In this scenario, the plurality of MAC addresses obtained by the first network device may be MAC addresses of other devices (for example, CE devices or user terminals connected to CE devices) learned by the first network device. In addition, the target MAC address may be a destination MAC address.

S404: The first network device sends the second condition to the second network device.

In this embodiment of this application, after determining the target load sharing mode, the first network device may send the second condition to the second network device. The second condition is used to indicate the second network device to determine, based on the second condition, a packet that needs to be forwarded in a load sharing mode, that is, determine a load sharing mode used when the second network device forwards the packet in a load sharing manner.

In some possible cases, the first network device may not send the second condition, but the second condition is determined by the second network device. For example, the second network device determines, based on a determining logic that is the same as that of the first network device, the second condition that needs to be used by the second network device, the operation and maintenance engineer configures a corresponding second condition, or the like.

S405: The first network device receives the first packet and the second packet.

The first packet and the second packet each may be a BUM packet to be sent to the third network device.

S406: The first network device forwards, by using the target load sharing mode, the first packet to the third network device on an access side based on that the first indication in the first ES route is the same as the second indication configured in the first network device.

After receiving the first ES route sent by the second network device, the first network device may first detect whether the first indication carried in the first ES route is the same as the second indication configured in the first network device. If the first indication carried in the first ES route is the same as the second indication configured in the first network device, the first network device may determine that the first network device and the second network device are load sharing devices for each other, that is, the first network device and the second network device are peer DF devices, and there is no active/standby division. Further, the first network device may forward the first packet (for example, a BUM packet) to the third network device on the access side by using the target load sharing mode. That is, the first network device may forward the first packet that meets the first condition to the third network device. In addition, if the first network device determines that the second packet does not meet the first condition, it may be determined that the first network device is not a device that needs to forward the second packet in a load sharing manner. Correspondingly, the first network device does not need to forward the second packet to the third network device.

If the first indication carried in the first ES route is different from the second indication configured in the first network device, the first network device may determine that the configuration is incorrect, and does not perform a subsequent operation. In addition, after determining that the configuration is incorrect, the first network device may further generate error reporting information, to indicate the operation and maintenance engineer to perform reconfiguration.

S407: The second network device receives the first packet and the second packet.

Because the third network device is multi-homed to the first network device and the second network device, the second network device can also receive the first packet and the second packet.

S408: The second network device forwards, based on that the second ES route carries the second indication, the second packet that meets the second condition to the third network device on the access side.

After receiving the second ES route sent by the first network device, the second network device may first detect whether the second indication carried in the second ES route is the same as the first indication configured in the second network device. If the second ES route carries the second indication that is the same as the first indication, the second network device may determine that the second network device and the first network device are load sharing devices for each other, that is, the second network device and the first network device are peer DF devices, and the second network may forward the second packet (for example, a BUM packet) to the third network device in a load sharing manner. In addition, the second network device may further determine, based on the second condition sent by the first network device, the second packet that needs to be forwarded in a load sharing manner. That is, the second network device may forward the second packet that meets the second condition to the third network device. In addition, if the second network device determines that the first packet does not meet the second condition, the second network device may determine that the second network device is not a device that needs to forward the first packet in a load sharing manner. Correspondingly, the second network device does not need to forward the first packet to the third network device.

If the second ES route does not carry the second indication that is the same as the first indication, the second network device may determine that the configuration is incorrect, and does not perform a subsequent operation. In addition, after determining that the configuration is incorrect, the second network device may also generate error reporting information, to indicate the operation and maintenance engineer to perform reconfiguration.

For example, it is assumed that the first condition includes that a source MAC address of a packet meets the third condition, and the second condition includes that a source MAC address of a packet meets a fourth condition. The third condition is that a last bit of the source MAC address is an odd number, and the fourth condition is that a last bit of the source MAC address is an even number. In addition, a value of the second indication configured in the first network device and a value of the first indication configured in the second network device each are 3. In this case, after receiving the first ES route sent by the second network device, the first network device may forward, to the third network device, the first packet whose source MAC address has an odd-numbered last bit. After receiving the second ES route sent by the first network device, the second network device may forward, to the third network device, the second packet whose source MAC address has an even-numbered last bit.

S409: The first network device forwards, according to an obtained disable instruction, a packet to the third network device without performing load sharing with the second network device.

In this embodiment of this application, if the first network device and the second network device do not need to forward packets to the third network device in a load sharing manner, the disable instruction may be used to indicate the first network device not to forward a packet in a load sharing manner, that is, a load sharing function of the first network device is disabled.

S410: The second network device forwards, according to the obtained disable instruction, a packet to the third network device without performing load sharing with the first network device.

Similar to S409, if the first network device or the second network device does not need to forward packets to the third network device in a load sharing manner, the disable instruction may be used to indicate the second network device not to forward a packet in a load sharing manner, that is, a load sharing function of the second network device is disabled.

Optionally, the disable instruction may be separately configured in the first network device and the second network device by the operation and maintenance engineer in a command line mode. Alternatively, the disable instruction may be separately delivered by a controller to the first network device and the second network device. Alternatively, the operation and maintenance engineer or the controller may deliver the disable instruction to only one of the first network device or the second network device, and the network device that obtains the disable instruction may forward the disable instruction to the other network device.

In this embodiment of this application, after disabling the load sharing functions according to the obtained disable instruction, the first network device and the second network device may restore roles of original DF devices or non-DF devices. That is, a selected DF device may continue to forward a BUM packet to the third network device. The disable instruction is used to disable the load sharing functions of the network devices, so that flexibility of the network devices during operation can be effectively improved, to meet requirements of different application scenarios.

It may be understood that a sequence of the steps of the packet sending method provided in the embodiment shown in FIG. 5 may be properly adjusted, and a quantity of steps may be correspondingly increased or decreased based on a situation. For example, S404 may be deleted based on a situation, and the second network device may also perform S403. That is, the first network device and the second network device may determine the first condition and the second condition based on a same rule.

Alternatively, S403 and S404 each may be deleted based on a situation. In a possible implementation, a target load sharing mode may be configured for each of the first network device and the second network device, and the two network devices may directly forward packets to the third network device by using pre-configured target load sharing modes. In another possible implementation, the first indication and the second indication may further indicate the target load sharing modes, the first network device may forward the first packet to the third network device in the target load sharing mode indicated by the first indication, and the second network device may forward the second packet to the third network device in the target load sharing mode indicated by the second indication.

In the foregoing two implementations, the target load sharing modes may be: A network device with a smaller IP address forwards the first packet whose target MAC address meets the first condition, and a network device with a larger IP address forwards the second packet whose target MAC address meets the second condition. In this case, after the first network device and the second network device send ES routes to each other, each network device may determine an IP address of a peer network device based on a received ES route, and may further determine a packet that needs to be forwarded by the network device in a load sharing manner. The IP address of the network device may be carried in an IP field of an initial router in the ES route.

In a scenario in which the first indication and the second indication may further indicate the target load sharing modes, when the first indication is different values, different load sharing modes may be indicated. Similarly, when the second indication is different values, different load sharing modes may be indicated. For example, the target load sharing mode indicated when a value of the first indication is 3 may be: A network device with a smaller IP address forwards a packet whose source MAC address has an odd-numbered last bit, and a network device with a larger IP address forwards a packet whose source MAC address has an even-numbered last bit. A target load sharing mode indicated when the value of the first indication is 4 may be: A network device with a smaller IP address forwards a packet whose destination MAC address has an even-numbered last bit, and a network device with a larger IP address forwards a packet whose destination MAC address has an odd-numbered last bit.

Alternatively, S401 and S402 each may be deleted based on a situation. For example, the operation and maintenance engineer may respectively configure the corresponding first indication and the corresponding second indication under a multi-active interface of the first network device and a multi-active interface of the second network device by using command lines, to respectively enable functions of forwarding packets in a load sharing manner by the first network device and the second network device. The multi-active interfaces are interfaces configured to connect to the third network device. In this scenario, the first indication and the second indication may be further used to indicate specifically used target load sharing modes. Optionally, in this scenario, the first network device and the second network device may further not perform DF device selection according to the first indication and the second indication.

For example, a command line configured in the first network device by the operation and maintenance engineer may be bum-forward type type1 odd, and a command line configured in the second network device may be bum-forward type type1 even. The foregoing command lines may be used to indicate the first network device to forward a BUM packet whose target MAC address has an even-numbered last bit, and indicate the second network device to forward a BUM packet whose target MAC address has an odd-numbered last bit.

In conclusion, this embodiment of this application provides a packet sending method. In a scenario in which the third network device is multi-homed to the first network device and the second network device, the first network device may forward a packet to the third network device in a manner of performing load sharing with the second network device. Compared with forwarding a packet by only a DF device, forwarding packets by the first network device and the second network device forward packets (for example, BUM packets) in a load sharing manner can ensure that load of the first network device and load of the second network device are relatively balanced. In some possible specific application scenarios, it may be further ensured that load of boards that are in the third network device and that are connected to the first network device and the second network device is also relatively balanced.

Figure 7:
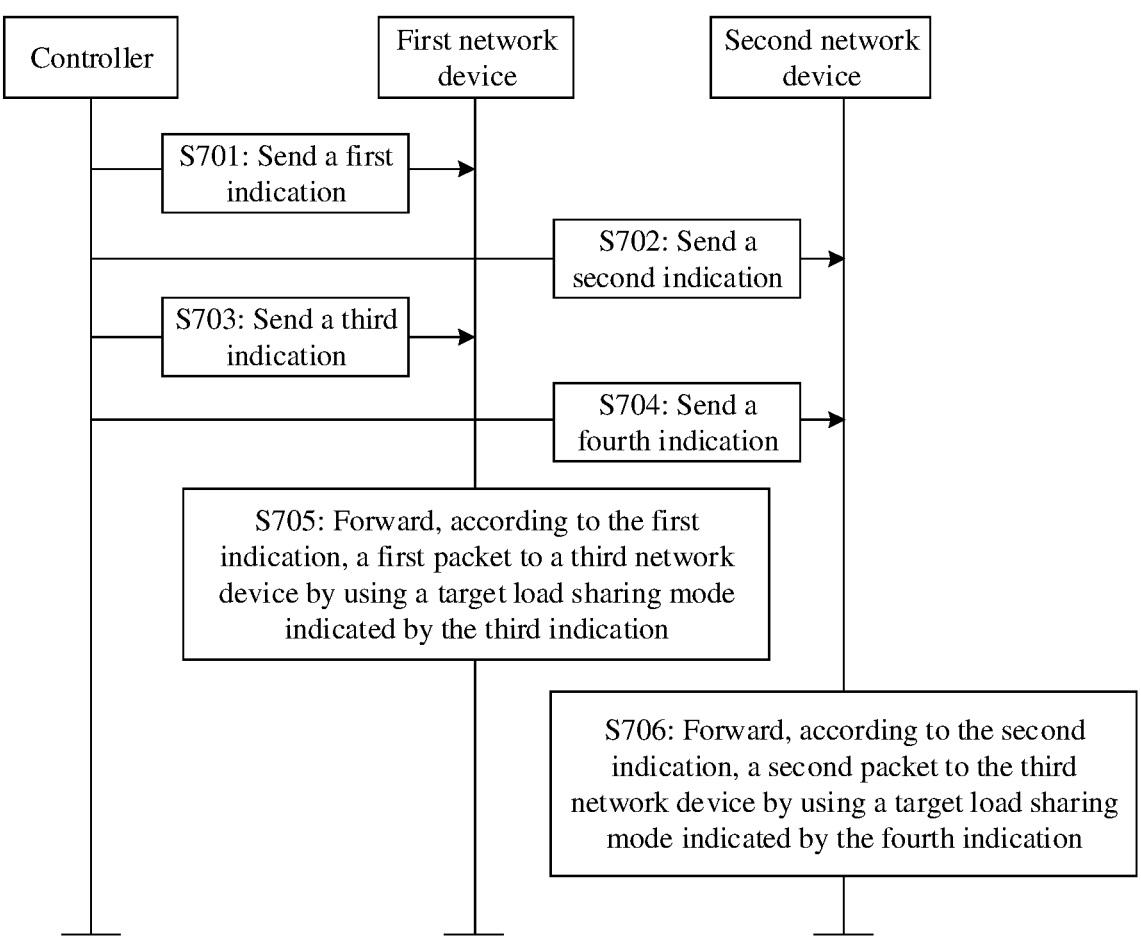
FIG. 7 is a flowchart of still another packet sending method according to an embodiment of this application.

The following describes the packet sending method provided in embodiments of this application by using an example in which the packet sending system further includes a controller 04 and the controller 04 separately sends an indication to the first network device 01 and the second network device 02. As shown in FIG. 7, the method may include the following steps.

S701: The controller sends a first indication to the first network device.

S702: The controller sends a second indication to the second network device.

The first indication is used to indicate that the first network device is a load sharing device that forwards a first packet to the third network device, and the second indication is used to indicate that the second network device is a load sharing device that forwards a second packet to the third network device. That is, the first indication and the second indication may be respectively used to indicate the first network device and the second network device to forward packets to the third network device on the access side in a load sharing manner. In an actual scenario, content of the first indication and content of the second indication may be the same or may be different.

S703: The controller sends a third indication to the first network device.

S704: The controller sends a fourth indication to the second network device.

In this embodiment of this application, the controller may further determine a target load sharing mode, send the third indication to the first network device, and send the fourth indication to the second network device. The third indication and the fourth indication may be respectively used to indicate a target load sharing mode that should be used by the first network device and a target load sharing mode that should be used by the second network device. The target load sharing mode may include: The first network device forwards the first packet that meets a first condition, and the second network device forwards the second packet that meets a second condition. The first condition is different from the second condition. For example, the first condition may include that a target MAC address of the first packet meets a third condition, and the second condition may include that a target MAC address of the second packet meets a fourth condition. The third condition is different from the fourth condition, and the target MAC addresses are source MAC addresses or destination MAC addresses of the packets. In an actual scenario, the third indication and the fourth indication may be the same or may be different.

The controller indicates the target load sharing mode by using separate indication information, so that the target load sharing mode can be conveniently adjusted, thereby improving load sharing flexibility.

Optionally, the target load sharing mode may be configured in the controller by an operation and maintenance engineer. Alternatively, the first network device and/or the second network device may report an obtained MAC address to the controller. Then, the controller may determine the target load sharing mode based on a distribution rule of a plurality of received MAC addresses. For a process in which the controller determines the target load sharing mode based on the MAC addresses, refer to related descriptions of S403. Details are not described herein again.

S705: The first network device forwards, according to the first indication, the first packet to the third network device by using the target load sharing mode indicated by the third indication.

After receiving the first indication delivered by the controller, the first network device may determine that the first network device and the second network device are peer DF devices, and the first network device may forward the first packet to the third network device by using the target load sharing mode indicated by the third indication. For example, the first network device may forward the first packet that meets the first condition to the third network device.

S706: The second network device forwards, according to the second indication, the second packet to the third network device by using the target load sharing mode indicated by the fourth indication.

After receiving the second indication delivered by the controller, the second network device may determine that the second network device and the first network device are peer DF devices, and the second network device may forward the second packet to the third network device by using the target load sharing mode indicated by the fourth indication. For example, the second network device may forward the second packet that meets the second condition to the third network device.

It should be understood that a sequence of the steps of the packet sending method provided in the embodiment shown in FIG. 7 may be properly adjusted, and a quantity of steps may be correspondingly increased or decreased based on a situation. For example, step S702 may be performed before step S701, or may be performed synchronously with step S701; and step S704 may be performed before step S703, or may be performed synchronously with step S703.

Alternatively, S703 and S704 may be deleted based on a situation, that is, the controller does not need to separately deliver the third indication and the fourth instruction. In this scenario, the first indication and the second indication that are respectively delivered to the first network device and the second network device by the controller may be used to indicate the first network device and the second network device to forward packets to the third network device by using the target load sharing modes. The controller directly indicates the target load sharing modes by using the first indication and the second indication, so that a quantity of indications that need to be sent by the controller can be reduced, thereby improving efficiency of indicating the network devices to perform load sharing.

In conclusion, this embodiment of this application provides a packet sending method. In a scenario in which the third network device is multi-homed to the first network device and the second network device, the first network device and the second network device may forward packets to the third network device in a load sharing manner based on indications delivered by the controller. Compared with forwarding a packet by only a DF device, forwarding packets (for example, BUM packets) by the first network device and the second network device in a load sharing manner can ensure that load of the first network device and load of the second network device are relatively balanced. In some possible specific application scenarios, it may be further ensured that load of boards that are in the third network device and that are connected to the first network device and the second network device is also relatively balanced.

Figure 8:
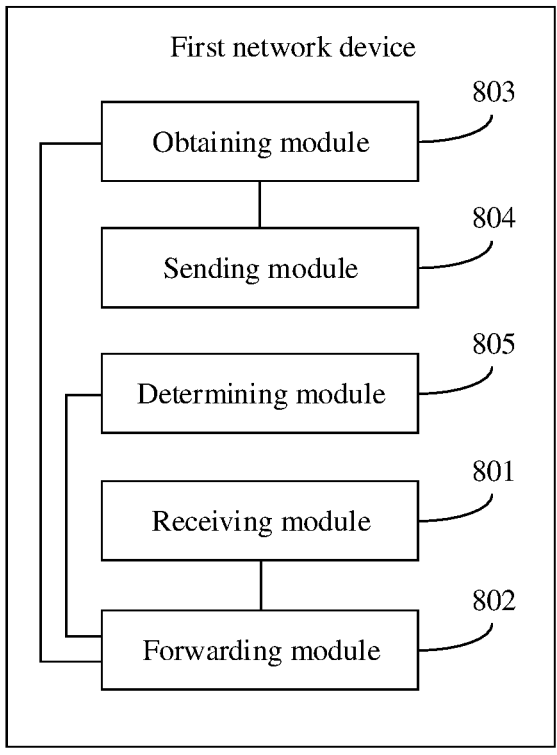
FIG. 8 is a schematic diagram of a structure of a first network device according to an embodiment of this application.

FIG. 8 is a schematic diagram of a structure of a first network device according to an embodiment of this application. The first network device may be used in the system shown in any one of FIG. 1 to FIG. 3, and may be configured to implement the steps performed by the first network device in the foregoing method embodiments. As shown in FIG. 8, the first network device may include:

a receiving module 801, configured to receive a first packet, where for function implementation of the receiving module 801, refer to related descriptions of S301 in the foregoing method embodiment; and a forwarding module 802, configured to forward the first packet to a third network device on an access side based on that the first network device is a device that needs to forward the first packet in a load sharing manner, where for function implementation of the forwarding module 802, refer to related descriptions of S302 in the foregoing method embodiment.

Optionally, as shown in FIG. 8, the first network device may further include:

an obtaining module 803, configured to obtain a first indication, where the first indication is used to indicate that the first network device is a load sharing device that forwards the first packet to the third network device.

Optionally, the obtaining module 803 is configured to receive the first indication sent by a second network device, receive the first indication sent by a controller, or obtain the first indication that is configured. For function implementation of the obtaining module 803, refer to related descriptions of S401 and S701 in the foregoing method embodiments.

Optionally, the obtaining module 803 may be configured to receive a first ES route that carries the first indication and that is sent by the second network device, so that the first network device determines that the first network device and the second network device are load sharing devices for each other.

Optionally, the forwarding module 802 is configured to determine, based on that the first indication in the first ES route is the same as a second indication configured in the first network device, that the first network device and the second network device are load sharing devices for each other. For the function implementation of the forwarding module 802, refer to related descriptions of S406 in the foregoing method embodiment.

Optionally, as shown in FIG. 8, the first network device may further include:

a sending module 804, configured to send, to the second network device, a second ES route that carries the second indication. For function implementation of the sending module 804, refer to related descriptions of S402 in the foregoing method embodiment.

Optionally, the forwarding module 802 is configured to: determine, based on that the first packet meets a first condition, that the first network device is a device that needs to forward the first packet in a load sharing manner; and forward the first packet to the third network device on the access side. For function implementation of the forwarding module 802, refer to related descriptions of S705 in the foregoing method embodiment.

Optionally, that the first packet meets the first condition includes: A target MAC address of the first packet meets a third condition, and the target MAC address is a source MAC address or a destination MAC address of the first packet.

Optionally, still with reference to FIG. 8, the first network device may further include:

a determining module 805, configured to: before the forwarding module 802 determines that the first network device is a device that needs to forward the first packet in a load sharing manner, determine that a difference between a quantity of MAC addresses that meet the third condition in a plurality of obtained MAC addresses and a quantity of MAC addresses that meet a fourth condition in the plurality of obtained MAC addresses is less than a difference threshold, where the fourth condition is used to indicate the second network device to determine, based on the fourth condition, a packet that needs to be forwarded in a load sharing manner, and the fourth condition is different from the third condition. For function implementation of the determining module 805, refer to related descriptions of S403 in the foregoing method embodiment.

Optionally, the third condition is that an $i^{th}$ bit of a MAC address is one of an odd number and an even number, and the fourth condition is that the $i^{th}$ bit of the MAC address is the other of the odd number and the even number, where i is a positive integer, and i is not greater than a total quantity of bits of the MAC address.

Alternatively, the third condition is that a value formed by n bits in a MAC address is within a first value range, and the fourth condition is that the value formed by the n bits in the MAC address is within a second value range, where the second value range is different from the first value range, n is a positive integer greater than 1, and n is not greater than a total quantity of bits of the MAC address.

Optionally, the first network device and the second network device each are a forwarding device, and the third network device is a BAS or a forwarding device connected to a BAS; and the target MAC address is the source MAC address.

Optionally, the first network device and the second network device each are a PE device, the third network device is a CE device, and the target MAC address is the destination MAC address.

Optionally, the receiving module 801 may be further configured to receive a second packet. For function implementation of the receiving module 801, refer to related descriptions of S405 in the foregoing method embodiment.

The forwarding module 802 may be further configured to skip forwarding the second packet to the third network device on the access side based on that the first network device is not a device that needs to forward the second packet in a load sharing manner.

Optionally, the forwarding module 802 may be further configured to forward, according to an obtained disable instruction, a packet to the third network device without performing load sharing with the second network device. For function implementation of the forwarding module 802, refer to related descriptions of S409 in the foregoing method embodiment.

Optionally, the first packet and the second packet each may be a BUM packet.

In conclusion, this embodiment of this application provides a first network device. In a scenario in which the third network device is multi-homed to the first network device and the second network device, the first network device may forward a packet to the third network device in a manner of performing load sharing with the second network device. Compared with forwarding a packet by only a DF device, forwarding packets by the first network device and the second network device in a load sharing manner can ensure that load of the first network device and load of the second network device are relatively balanced. In some possible specific application scenarios, it may be further ensured that load of boards that are in the third network device and that are connected to the first network device and the second network device is also relatively balanced.

Figure 9:
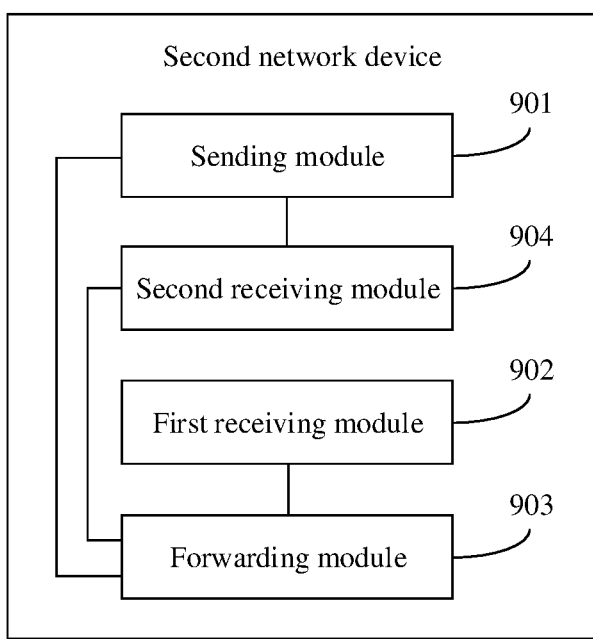
FIG. 9 is a schematic diagram of a structure of a second network device according to an embodiment of this application.

FIG. 9 is a schematic diagram of a structure of a second network device according to an embodiment of this application. The second network device may be used in the system shown in any one of FIG. 1 to FIG. 3, and may be configured to implement the steps performed by the second network device in the foregoing embodiments. As shown in FIG. 9, the second network device may include:

a sending module 901, configured to send a first indication to a first network device, where the first indication is used to indicate that the first network device is a load sharing device that forwards a first packet to a third network device, and for function implementation of the sending module 901, refer to related descriptions of S401 in the foregoing method embodiment;

a first receiving module 902, configured to receive a second packet, where for function implementation of the first receiving module 902, refer to related descriptions of S407 in the foregoing method embodiment; and a forwarding module 903, configured to forward the second packet to the third network device on an access side based on that the second network device is a device that needs to forward the second packet in a load sharing manner, where for function implementation of the forwarding module 903, refer to related descriptions of S408 and S706 in the foregoing method embodiments.

Optionally, the sending module 901 is configured to send, to the first network device, a first ES route that carries the first indication.

Optionally, as shown in FIG. 9, the second network device may further include:

a second receiving module 904, configured to receive a second ES route sent by the first network device. For function implementation of the second receiving module 904, refer to related descriptions of S402 in the foregoing method embodiment.

The forwarding module 903 is configured to determine, based on that the second ES route carries a second indication, that the second network device and the first network device are load sharing devices for each other, where the second indication is the same as the first indication.

Optionally, the forwarding module 903 may be configured to determine, based on that the second packet meets a condition, that the second network device is a device that needs to forward the second packet in a load sharing manner.

Optionally, the forwarding module 903 may be further configured to forward, according to an obtained disable instruction, a packet to the third network device without performing load sharing with the first network device. For function implementation of the forwarding module 903, refer to related descriptions of S410 in the foregoing method embodiment.

In conclusion, this embodiment of this application provides a second network device. In a scenario in which the third network device is multi-homed to the first network device and the second network device, the second network device may send the first indication to the first network device, so that the second network device and the first network device forward packets to the third network device in a load sharing manner. Compared with forwarding a packet by only a DF device, forwarding packets by the first network device and the second network device in a load sharing manner can ensure that load of the first network device and load of the second network device are relatively balanced. In some possible specific application scenarios, it may be further ensured that load of boards that are in the third network device and that are connected to the first network device and the second network device is also relatively balanced.

Figures 10, 11:
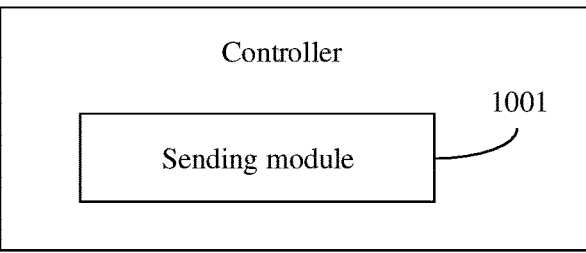
FIG. 10 is a schematic diagram of a structure of a controller according to an embodiment of this application.
FIG. 11 is a schematic diagram of a structure of a network device according to an embodiment of this application.

FIG. 10 is a schematic diagram of a structure of a controller according to an embodiment of this application. The controller may be used in the packet sending system shown in FIG. 3, and may be configured to implement the steps performed by the controller in the foregoing embodiments. As shown in FIG. 10, the controller may include:

a sending module 1001, configured to send a first indication to a first network device and send a second indication to a second network device, where the first indication is used to indicate that the first network device is a load sharing device that forwards a first packet to a third network device, and the second indication is used to indicate that the second network device is a load sharing device that forwards a second packet to the third network device. For function implementation of the sending module 1001, refer to related descriptions of S701 and S702 in the foregoing method embodiment.

Optionally, the first indication may be used to indicate the first network device to forward the first packet that meets a first condition to the third network device, and the second indication may be used to indicate the second network device to forward the second packet that meets a second condition to the third network device.

Alternatively, the sending module 1001 is further configured to send a third indication to the first network device, and send a fourth indication to the second network device, where the third indication is used to indicate the first network device to forward the first packet that meets the first condition to the third network device, and the fourth indication is used to indicate the second network device to forward the second packet that meets the second condition to the third network device. The first condition is different from the second condition. For function implementation of the sending module 1001, refer to related descriptions of S703 and S704 in the foregoing method embodiment.

In conclusion, this embodiment of this application provides a controller. In a scenario in which the third network device is multi-homed to the first network device and the second network device, the controller may send an indication to the first network device and send an indication to the second network device, to indicate the first network device and the second network device to forward packets to the third network device in a load sharing manner. Compared with forwarding a packet by only a DF device, forwarding packets by the first network device and the second network device in a load sharing manner can ensure that load of the first network device and load of the second network device are relatively balanced. In some possible specific application scenarios, it may be further ensured that load of boards that are in the third network device and that are connected to the first network device and the second network device is also relatively balanced.

It may be clearly understood by a person skilled in the art that, for the purpose of convenient and brief description, for detailed working processes of the first network device, the second network device, the controller, and each module that are described above, refer to corresponding processes in the foregoing method embodiments. Details are not described herein again.

It should be understood that the first network device, the second network device, and the controller provided in this embodiment of this application may alternatively be implemented by using an application-specific integrated circuit (ASIC) or a programmable logic device (PLD). The PLD may be a complex programmable logical device (CPLD), a field-programmable gate array (FPGA), a generic array logic (GAL), or any combination thereof. The packet sending methods provided in the foregoing method embodiments may alternatively be implemented by using software. When the packet sending methods provided in the foregoing method embodiments are implemented by using software, modules in the first network device, the second network device, and the controller may be software modules.

FIG. 11 is a schematic diagram of a structure of a network device according to an embodiment of this application. The network device 1100 may be the first network device or the second network device in any one of the foregoing embodiments. The network device 1100 may be used in the system shown in FIG. 1, FIG. 2, or FIG. 3. As shown in FIG. 11, the network device 1100 includes a main control board 1110, an interface board 1130, and an interface board 1140. When there are a plurality of interface boards, a switching board (not shown in the figure) may be included. The switching board is configured to complete data exchange between the interface boards (the interface boards are also referred to as line cards or service boards).

The main control board 1110 is configured to complete functions such as system management, device maintenance, and protocol processing. The interface boards 1130 and 1140 are configured to provide various service interfaces (for example, a POS interface, a GE interface, and an ATM interface), and forward a packet. The main control board 1110 mainly includes three types of function units: a system management and control unit, a system clock unit, and a system maintenance unit. The main control board 1110, the interface board 1130, and the interface board 1140 are connected to a system backboard through a system bus to implement interworking. The interface board 1130 includes one or more processors 1131. The processor 1131 is configured to control and manage the interface board, communicate with a central processing unit 1111 on the main control board 1110, and forward a packet. A memory 1132 on the interface board 1130 is configured to store a forwarding entry, and the processor 1131 forwards a packet by searching for the forwarding entry stored in the memory 1132.

The interface board 1130 includes one or more network interfaces 1133, configured to receive a packet sent by a previous-hop node, and send a processed packet to a next-hop node according to an indication of the processor 1131. A specific implementation process is not described herein again. Specific functions of the processor 1131 are not described herein again.

It may be understood that, as shown in FIG. 11, this embodiment includes a plurality of interface boards, and uses a distributed forwarding mechanism. In this mechanism, operations on the interface board 1140 are basically similar to operations on the interface board 1130. For brevity, details are not described again. In addition, it may be understood that the processor 1131 on the interface board 1130 and/or a processor 1141 on the interface board 1140 in FIG. 11 may be special-purpose hardware or a chip, for example, a network processor or an application-specific integrated circuit, to implement the foregoing functions. This implementation is generally referred to as a manner of using dedicated hardware or a chip for processing on a forwarding plane. In another implementation, the processor 1131 and/or the processor 1141 may alternatively be a general-purpose processor, for example, a general-purpose CPU, to implement the functions described above.

In addition, it should be understood that there may be one or more main control boards. When there are a plurality of main control boards, a primary main control board and a secondary main control board may be included. There may be one or more interface boards, and the device having a stronger data processing capability provides more interface boards. If there are a plurality of interface boards, the plurality of interface boards can communicate with each other by using one or more switching boards, and the plurality of interface boards can jointly implement load sharing and redundancy backup. In a centralized forwarding architecture, the device may not need the switching board, and the interface board provides a function of processing service data of an entire system. In a distributed forwarding architecture, the device includes a plurality of interface boards. Data exchange between the plurality of interface boards may be implemented by using a switching board, to provide a large-capacity data exchange and processing capability. Therefore, a data access and processing capability of a network device in a distributed architecture is better than that of a device in a centralized architecture. A specific architecture that is to be used depends on a specific networking deployment scenario. This is not limited herein.

In a specific embodiment, the memory 1132 may be a read-only memory (ROM), another type of static storage device that can store static information and instructions, a random access memory (RAM), another type of dynamic storage device that can store information and instructions, an electrically erasable programmable read-only memory (EEPROM), a compact disc read-only memory (CD-ROM), another optical disc storage, an optical disc storage (including a compact disc, a laser disc, an optical disc, a digital versatile disc, a Blu-ray disc, or the like), a magnetic disk, another magnetic storage device, or any other medium that can be used to carry or store expected program code in a form of an instruction or a data structure and that can be accessed by a computer. However, the memory 1132 is not limited thereto. The memory 1132 may exist independently, and is connected to the processor 1131 through a communication bus. The memory 1132 may alternatively be integrated with the processor 1131.

The memory 1132 is configured to store program code, and the processor 1131 controls execution of the program code, to perform the packet sending methods provided in the foregoing embodiments. The processor 1131 is configured to execute the program code stored in the memory 1132. The program code may include one or more software modules. The one or more software modules may be the function modules provided in the embodiments shown in FIG. 8 or FIG. 9.

In a specific embodiment, the network interface 1133 may be an apparatus using any transceiver, and is configured to communicate with another device or a communication network, for example, an Ethernet, a radio access network (RAN), or a wireless local area network (WLAN).

Figure 12:
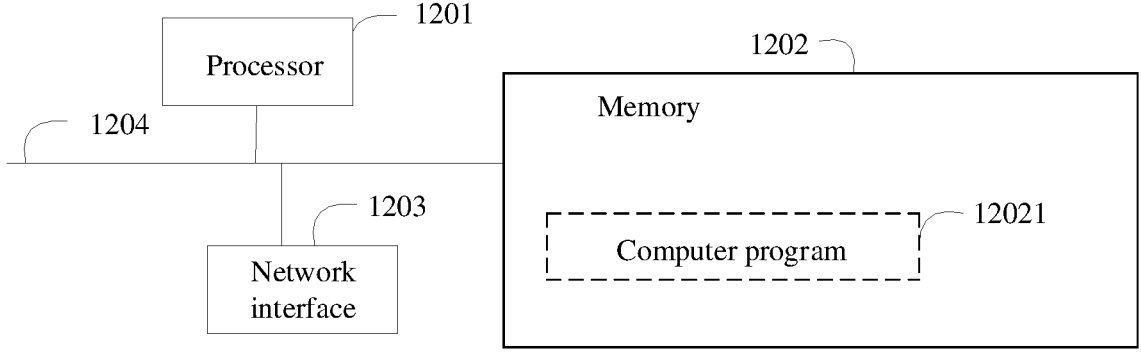
FIG. 12 is a schematic diagram of a structure of a device according to an embodiment of this application.

FIG. 12 is a schematic diagram of a structure of a device according to an embodiment of this application. The device may be the first network device, the second network device, or the controller in the foregoing embodiments. As shown in FIG. 12, the device may include a processor 1201, a memory 1202, a transceiver 1203, and a bus 1204. The bus 1204 is configured to connect the processor 1201, the memory 1202, and the transceiver 1203. A communication connection to another device may be implemented by using the transceiver 1203 (which may be wired or wireless). The memory 1202 stores a computer program, and the computer program is used to implement various application functions.

It should be understood that in this embodiment of this application, the processor 1201 may be a CPU, or the processor 1201 may be another general-purpose processor, a digital signal processor (DSP), an application-specific integrated circuit (ASIC), a field programmable gate array (FPGA), a GPU or another programmable logic device, a discrete gate or a transistor logic device, a discrete hardware component, or the like. The general-purpose processor may be a microprocessor, any conventional processor, or the like.

The memory 1202 may be a volatile memory or a nonvolatile memory, or may include both a volatile memory and a nonvolatile memory. The nonvolatile memory may be a ROM, a programmable read-only memory (programmable ROM, PROM), an erasable programmable read-only memory (erasable PROM, EPROM), an EEPROM, or a flash memory. The volatile memory may be a RAM, and serves as an external cache. By way of example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The bus 1204 may further include a power bus, a control bus, a status signal bus, and the like, in addition to a data bus. However, for clear description, various types of buses in the figure are marked as the bus 1204.

When the device is the first network device, the processor 1201 is configured to execute the computer program stored in the memory 1202, and the processor 1201 may execute the computer program 12021 to implement the steps performed by the first network device in the foregoing method embodiments.

When the device is the second network device, the processor 1201 is configured to execute the computer program stored in the memory 1202, and the processor 1201 may execute the computer program 12021 to implement the steps performed by the second network device in the foregoing method embodiments.

When the device is the controller, the processor 1201 is configured to execute the computer program stored in the memory 1202, and the processor 1201 may execute the computer program 12021 to implement the steps performed by the controller in the foregoing method embodiments.

An embodiment of this application further provides a computer-readable storage medium. The computer-readable storage medium stores instructions, and the instructions are executed by a processor to implement the steps performed by the first network device, the second network device, or the controller in the foregoing method embodiments.

An embodiment of this application further provides a computer program product including instructions. When the computer program product runs on a computer, the computer is enabled to perform the steps performed by the first network device, the second network device, or the controller in the foregoing method embodiments.

An embodiment of this application further provides a communication system. As shown in FIG. 1 and FIG. 3, the communication system may include a first network device 01, a second network device 02, and a third network device 03. The first network device 01 and the second network device 02 are load sharing devices for each other when forwarding packets to the third network device 03. The third network device 03 is multi-homed to the first network device 01 and the second network device 02. For example, both the first network device 01 and the second network device 02 may be located in an EVPN, and the third network device 03 may be a device that accesses the EVPN. The first network device 01 may be the device shown in FIG. 8, FIG. 11, or FIG. 12.

Optionally, the second network device 02 may be the device shown in FIG. 9, FIG. 11, or FIG. 12. Alternatively, with reference to FIG. 3, the communication system may further include a controller 04. The controller 04 may be the device shown in FIG. 10 or FIG. 12.

In an optional implementation, the third network device 03 may be a CE device configured to connect to a user terminal, and the first network device 01 and the second network device 02 each may be a PE device. For example, with reference to FIG. 1 and FIG. 2, the third network device 03 may be a forwarding device 20 located in an access equipment room or a forwarding device 30 located in an aggregation equipment room, and the first network device 01 and the second network device 02 each may be a forwarding device 60 located in an edge DC.

In another optional implementation, with reference to FIG. 1 and FIG. 2, the third network device 03 may be a BAS 70 or a service router connected to a BAS 70. The first network device 01 and the second network device 02 may be forwarding devices 60 located in a core equipment room.

Optionally, the communication system provided in this embodiment of this application may further include at least one another network device, and the at least one another network device, the first network device 01, and the second network device 02 may belong to multi-homing devices of the third network device 03. That is, a quantity of network devices to which the third network device 03 is multi-homed may be greater than or equal to 2.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

The foregoing descriptions are merely optional implementations of this application, but the protection scope of this application is not limited thereto. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A system, comprising:
a first network device; a second network device; and
a third network device;
wherein the first network device and the second network device are load sharing devices for each other with respect to forwarding packets to the third network device, and the third network device is multi-homed to the first network device and the second network device;
wherein the first network device is configured to:
receive a first packet and a second packet;
determine, based on the first packet meeting a first condition, that the first network device is a device to forward the first packet in a load sharing manner, wherein the first packet meeting the first condition comprises a first target media access control (MAC) address of the first packet meets a third condition, and the first target MAC address is a source MAC address or a destination MAC address of the first packet; and
forward the first packet to the third network device based on the first network device being the device to forward the first packet in the load sharing manner; and
wherein the second network device is configured to:
receive the first packet and the second packet;
determine, based on the second packet meeting a second condition, that the second network device is a device to forward the second packet in a load sharing manner, wherein the second packet meeting the second condition comprises a second target MAC address of the second packet meets a fourth condition, and the second target MAC address is a source MAC address or a destination MAC address of the second packet; and forward the second packet to the third network device based on the second network device being the device to forward the second packet in the load sharing manner; wherein the third condition is different from the fourth condition, the system further comprises:

determining, by the first network device, that a difference between a quantity of MAC addresses that meet the third condition in a plurality of obtained MAC addresses and a quantity of MAC addresses that meet the fourth condition in the plurality of obtained MAC addresses is less than a difference threshold.

2. The system according to claim 1, wherein:

the third condition is that an $i^{th}$ bit of a MAC address is one of an odd number and an even number, and the fourth condition is that the $i^{th}$ bit of the MAC address is the other of the odd number and the even number, wherein i is a positive integer, and i is not greater than a total quantity of bits of the MAC address; or the third condition is that a value formed by n bits in a MAC address is within a first value range, and the fourth condition is that the value formed by the n bits in the MAC address is within a second value range, wherein the second value range is different from the first value range, n is a positive integer greater than 1, and n is not greater than a total quantity of bits of the MAC address.

3. The system according to claim 1, wherein the first network device is a forwarding device and the second network device is a forwarding device, and the third network device is a broadband access server or a forwarding device connected to a broadband access server; and the first target MAC address is a source MAC address of the first packet and the second target MAC address is a source MAC address of the second packet.

4. The system according to claim 1, wherein the first network device is a provider edge (PE) device and the second network device is a PE device, and the third network device is a customer edge (CE) device; and wherein the first target MAC address is a destination MAC address of the first packet and the second target MAC address is a destination MAC address.

5. The system according to claim 1, wherein:

the first network device is further configured to obtain a first indication, and determine, according to the first indication, that the first network device is a load sharing device that forwards the first packet to the third network device; and the second network device is further configured to obtain a second indication, and determine, according to the second indication, that the second network device is a load sharing device that forwards the second packet to the third network device.

6. The system according to claim 5, wherein:

the first network device being configured to obtain the first indication comprises the first network device being configured to:

receive a first Ethernet segment (ES) route that carries the first indication and that is sent by the second network device; and the second network device being configured to obtain the second indication comprises the second network device being configured to:

receive a second ES route that carries the second indication and that is sent by the first network device, wherein the second indication is the same as the first indication.

7. The system according to claim 5, further comprising:

a controller, configured to send the first indication to the first network device, and send the second indication to the second network device.

8. The system according to claim 1, wherein:

the first network device is further configured to forward, according to an obtained disable instruction, the first packet to the third network device without performing load sharing with the second network device; and the second network device is further configured to forward, according to the obtained disable instruction, the second packet to the third network device without performing load sharing with the first network device.

9. The system according to claim 1, wherein the first network device and the second network device are located in an Ethernet virtual private network (EVPN), and the third network device accesses the EVPN.

10. The system according to claim 1, wherein:

the first network device is further configured to receive a plurality of packets including the first packet and the second packet, and determine that the first network device does not need to forward the second packet based on the second target MAC address of the second packet not meeting the third condition; and the second network device is further configured to receive the plurality of packets and determine that the second network device does not need to forward the first packet based on the first target MAC address of the first packet not meeting the fourth condition.

11. The system according to claim 1, wherein:

the first network device is further configured to forward, according to an obtained disable instruction, packets to the third network device without performing load sharing with the second network device; and the second network device is further configured to forward, according to the obtained disable instruction, packets to the third network device without performing load sharing with the first network device.

12. A method, applied to a system, wherein the system comprises a first network device, a second network device, and a third network device, the first network device and the second network device are load sharing devices for each other with respect to forwarding packets to the third network device, and the third network device is multi-homed to the first network device and the second network device, and the method comprises:

receiving, by the first network device, a first packet;

determining, by the first network device based on the first packet meeting a first condition, that the first network device is the device to forward the first packet in a load sharing manner, wherein the first packet meeting the first condition comprises a target media access control (MAC) address of the first packet meets a third condition, and the target MAC address is a source MAC address or a destination MAC address of the first packet; and forwarding, by the first network device, the first packet to the third network device on an access side based on the first network device being the device to forward the first packet in the load sharing manner, the method further comprises:

determining, by the first network device, that a difference between a quantity of MAC addresses that meet the third condition in a plurality of obtained MAC addresses and a quantity of MAC addresses that meet a fourth condition in the plurality of obtained MAC addresses is less than a difference threshold.

13. The method according to claim 12, wherein before receiving, by the first network device, the first packet, the method comprises:

obtaining, by the first network device, a first indication, wherein the first indication indicates that the first network device is a load sharing device that forwards the first packet to the third network device.

14. The method according to claim 13, wherein obtaining, by the first network device, the first indication comprises:

receiving, by the first network device, the first indication sent by the second network device;

receiving, by the first network device, the first indication sent by a controller; or obtaining, by the first network device, the first indication that is preconfigured.

15. The method according to claim 14, wherein receiving, by the first network device, the first indication sent by the second network device comprises:

receiving, by the first network device, a first Ethernet segment (ES) route that carries the first indication and that is sent by the second network device, and determining that the first network device and the second network device are load sharing devices for each other.

16. The method according to claim 15, wherein determining that the first network device and the second network device are load sharing devices for each other comprises:

determining, by the first network device based on that the first indication in the first ES route is the same as a second indication configured in the first network device, that the first network device and the second network device are load sharing devices for each other.

17. The method according to claim 16, further comprising:

sending, by the first network device to the second network device, a second ES route that carries the second indication.

18. The method according to claim 12, further comprising:

determining, by the first network device, that a difference between a quantity of MAC addresses that meet a third condition in a plurality of obtained MAC addresses and a quantity of MAC addresses that meet a fourth condition in the plurality of obtained MAC addresses is less than a difference threshold, wherein the fourth condition indicates the second network device to determine, based on the fourth condition, a packet to be forwarded in the load sharing manner, and the fourth condition is different from the third condition.

19. The method according to claim 12, wherein:

the first packet meeting the first condition comprises a target media access control (MAC) address of the first packet meets the third condition, and the target MAC address is a source MAC address or a destination MAC address of the first packet; and the method further comprises determining, by the first network device, that the third condition is that an $i^{th}$ bit of a MAC address is one of an odd number and an even number, wherein i is a positive integer, and i is not greater than a total quantity of bits of the MAC address.

20. A method, applied to a system, wherein the system comprises a first network device, a second network device, and a third network device, the first network device and the second network device are load sharing devices for each other with respect to forwarding packets to the third network device, and the third network device is multi-homed to the first network device and the second network device, and the method comprises:

receiving, by the first network device, a first packet; and forwarding, by the first network device, the first packet to the third network device on an access side based on the first network device being a device to forward the first packet in a load sharing manner, wherein forwarding, by the first network device, the first packet to the third network device on the access side based on the first network device being the device to forward the first packet in the load sharing manner comprises:

determining, by the first network device based on the first packet meeting a first condition, that the first network device is the device to forward the first packet in the load sharing manner, wherein the first packet meeting the first condition comprises: a target media access control (MAC) address of the first packet meets a third condition, and the target MAC address is a source MAC address or a destination MAC address of the first packet; and forwarding, by the first network device, the first packet to the third network device on the access side, wherein before determining, by the first network device based on the first packet meeting the first condition, that the first network device is the device to forward the first packet in the load sharing manner, the method further comprises:

determining, by the first network device, that a difference between a quantity of MAC addresses that meet the third condition in a plurality of obtained MAC addresses and a quantity of MAC addresses that meet a fourth condition in the plurality of obtained MAC addresses is less than a difference threshold, wherein the fourth condition indicates the second network device to determine, based on the fourth condition, a packet to be forwarded in the load sharing manner, and the fourth condition is different from the third condition.

* * * * *